United States Patent
Graves et al.

(10) Patent No.: US 9,213,142 B2
(45) Date of Patent: Dec. 15, 2015

(54) DEVICE AND METHOD FOR MICRO-ELECTRO-MECHANICAL-SYSTEM PHOTONIC SWITCH

(71) Applicant: Huawei Technologies Co., Ltd., Shenzhen (CN)

(72) Inventors: Alan Frank Graves, Kanata (CA); Dominic John Goodwill, Ottawa (CA)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 14/086,776

(22) Filed: Nov. 21, 2013

(65) Prior Publication Data

US 2015/0139585 A1     May 21, 2015

(51) Int. Cl.
| | |
|---|---|
| G02B 6/26 | (2006.01) |
| G02B 6/42 | (2006.01) |
| G02B 6/35 | (2006.01) |
| G02B 26/08 | (2006.01) |

(52) U.S. Cl.
CPC .......... *G02B 6/3518* (2013.01); *G02B 26/0833* (2013.01)

(58) Field of Classification Search
CPC ........................ G02B 6/3518; G02B 26/0833
USPC ........................................................ 385/16–18
See application file for complete search history.

(56) References Cited

U.S. PATENT DOCUMENTS

| | | | |
|---|---|---|---|
| 6,643,425 B1 | 11/2003 | Bowers et al. | |
| 2003/0086147 A1* | 5/2003 | Bruns | 359/291 |
| 2005/0031251 A1 | 2/2005 | Schroeder | |
| 2005/0220394 A1 | 10/2005 | Yamamoto et al. | |
| 2007/0222678 A1* | 9/2007 | Ishio et al. | 342/372 |
| 2007/0292077 A1 | 12/2007 | Holmstrom et al. | |
| 2015/0041629 A1* | 2/2015 | Graves et al. | 250/214 SW |

FOREIGN PATENT DOCUMENTS

JP     2003202418 A     7/2003

OTHER PUBLICATIONS

International Search Report and Written Opinion of Patent Cooperation Treaty (PCT), International Application No. PCT/CN2014/091862, Applicant Huawei Technologies Co., Ltd., date of mailing Jan. 26, 2015, 13 pages.
Aksyuk, V.A., et al., "238 x 238 Micromechanical Optical Cross Connect," IEEE Photonics Technology Letters, vol. 15, No. 4, Apr. 2003, pp. 587-589.
Calient Technologies, Inc., "S320 Photonic Switch," Calient Data Sheet-2012, 2 pages.
Chu, P.B., et al., "Design and Nonlinear Servo Control of MEMS Mirrors and Their Performance in a Large Port-Count Optical Switch," Journal of Microelectromechanical Systems, vol. 14, No. 2, Apr. 2005, pp. 261-273.
Kawajiri, Y., et al., "512 x 512 Port 3D MEMS Optical Switch Module with Toroidal Concave Mirror," NTT Technical Review, vol. 10, No. 11, Nov. 2012, pp. 1-7.
Kim, J., et al., "1100 x 1100 Port MEMS-Based Optical Crossconnect With 4-dB Maximum Loss," IEEE Photonics Technology Letters, vol. 15, No. 11, Nov. 2003, pp. 1537-1539.
Wu, M.C., "Optical MEMS for Telecommunication Systems," Lecture for EE 233, University of California, Berkeley Department of EECS & Berkeley Sensor and Actuator Center (BSAC), Aug. 20, 2009, pp. 1-41.

* cited by examiner

*Primary Examiner* — Ryan Lepisto
(74) *Attorney, Agent, or Firm* — Slater & Matsil, L.L.P.

(57) ABSTRACT

In one embodiment, a micro-electro-mechanical-system (MEMS) photonic switch includes a first plurality of collimators and a first minor array optically coupled to the first plurality of collimators, where the first minor array includes a first plurality of minors, and where a first minor of the first plurality of minors includes a first plurality of photodiodes integrated on the first mirror.

22 Claims, 14 Drawing Sheets

DEVICE AND METHOD FOR MICRO-ELECTRO-MECHANICAL-SYSTEM PHOTONIC SWITCH

TECHNICAL FIELD

The present invention relates to photonics, and, in particular, to a device and method for a micro-electro-mechanical-system (MEMS) photonic switch.

BACKGROUND

A type of photonic switch is a three dimensional (3D) micro-electro-mechanical-system (MEMS) photonic switch. MEMS photonic switches have excellent properties, such as the ability to achieve a high port count. Also, MEMS photonic switches have excellent optical properties, such as low loss, low polarization dependence, high linearity, and low noise. Additionally, MEMS photonic switches have excellent off-state properties, such as high isolation and low crosstalk.

However, MEMS photonic switches have some issues that limit their widespread use, such as slow switching speeds, driven by complex methods of control. This is especially problematic when MEMS photonic switches are used in a cascade configuration, such as in a three stage CLOS switch, or to set up a path transiting multiple nodes across a photonic switched network. Also, control methods may leave residual modulation introduced by the switch, which can interfere with the cascading of the switch.

SUMMARY

An embodiment micro-electro-mechanical-system (MEMS) photonic switch includes a first plurality of collimators and a first mirror array optically coupled to the first plurality of collimators, where the first mirror array includes a first plurality of minors, and where a first minor of the first plurality of mirrors includes a first plurality of photodiodes integrated on the first minor.

An embodiment method of aligning a first mirror and a second mirror of a micro-electro-mechanical system (MEMS) photonic switch includes receiving, by a first collimator of a first plurality of collimators, a first optical control signal and reflecting, by the first mirror on a first minor array, the first optical control signal to produce a first optical control beam. The method also includes detecting, by a first photodiode having a first location on the second mirror of a second mirror array, a first beam spot of the first optical control beam to produce a first detected signal.

An embodiment control system includes a minor acquisition control unit configured to be coupled to a micro-electro-mechanical-system (MEMS) photonic switch, where the minor acquisition control unit is configured to receive a first plurality of signals from a first plurality of photodiodes having a first plurality of locations on a first MEMS mirror of a first MEMS mirror array of the MEMS photonic switch. The control system also includes a mirror driver coupled to the mirror acquisition control unit, where the mirror driver is configured to be coupled to the MEMS photonic switch, and where the mirror driver is configured to control a second minor of a second MEMS mirror array of the MEMS photonic switch in accordance with the first plurality of signals and the first plurality of locations.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, photodiodes are placed on the surface of micro-electro-mechanical-system (MEMS) minors in a MEMS photonic switch. Photodiodes may also be placed interstitially on a substrate between the MEMS mirrors. The photodiodes are used during the set up phase to align mirrors by detecting the beam landing spots on the opposite substrate with a high degree of precision, allowing direct computation of a vector to the correct pointing. Optical beams at a control wavelength propagate in both directions through the photonic switch, illuminating only the photodiodes on the opposing substrate. Thus, opposing two minors may be independently and simultaneously aligned.

A three-dimensional (3D) MEMS photonic switch may use one or two arrays of steerable mirrors to form switchable optical paths between collimator arrays. When one mirror array is used, the minor array is arranged opposite a static planar or near planar retro-reflective minor. In this example, the control wavelength propagates in both directions through the photonic switch, illuminating only the photodiodes around the second mirror encountered on each control carrier's path.

Figure 1:
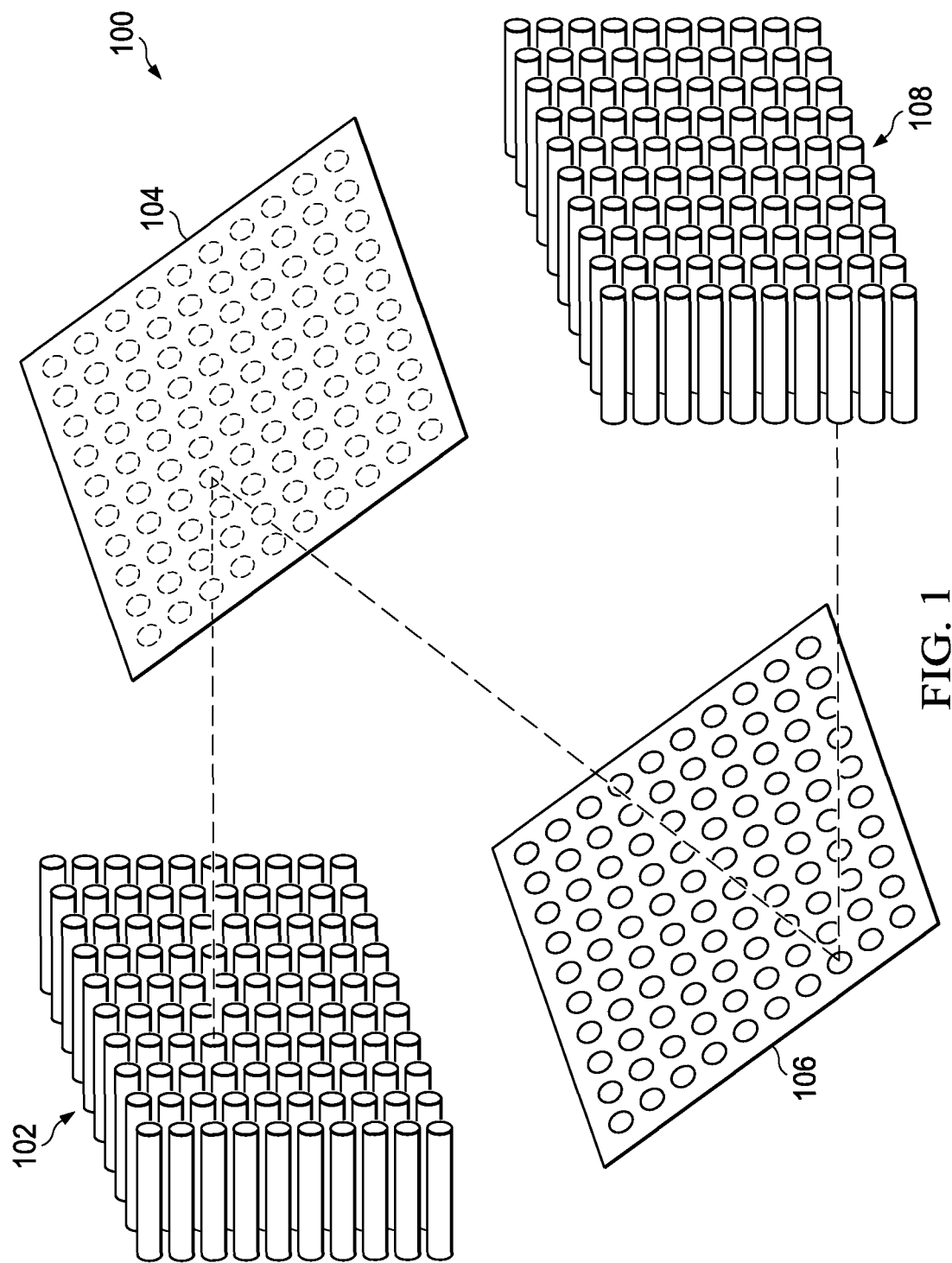
FIG. 1 illustrates an embodiment micro-electro-mechanical-system (MEMS) photonic switch.

FIG. 1 illustrates MEMS photonic switch 100, a three dimensional (3D) MEMS photonic switch with two arrays of steerable minors. MEMS photonic switch 100 contains minor arrays 104 and 106. Light enters via collimator array 102, for example from optical fibers, and impinges on minors of mirror array 104. Mirrors of minor array 104 are adjusted in angle in two planes to cause the light to impinge on the appropriate minors of minor array 106. The minors of mirror array 106 are associated with particular output ports of collimator array 108. Also, minors of mirror array 106 are adjusted in angle in two planes to cause coupling to the appropriate output port. The light then exits in a collimator of collimator array 108, for example coupling to optical fibers. Similarly, light enters collimator array 108, reflects off minors of mirror array 106, reflects off mirrors of minor array 104, and exits through collimator array 102.

The minor arrays have arrays of steerable 3D-MEMS minors (referred to here as MEMS minors) which reflect a beam projected onto them by an associated collimator. The reflected beam is then reflected on an opposing mirror on the opposing mirror array. Thus, an N×N MEMS photonic switching module contains N input mirrors, each of which can access any of N mirrors on the opposing minor array, and vice versa. This enables the minor count to grow linearly with the port count of the switch, utilizing 2N steerable minors for an N×N switch. For many other methods of building photonic switches, the mirror count or crosspoint count grows as the square of the port count. Thus, MEMS photonic switches are able to scale to a large port count, while some other approaches are limited by minor count or crosspoint count. However, as the port count grows in a MEMS photonic switch, the optical path length between the mirrors and/or the maximum minor deflection angle increases.

Figure 2:
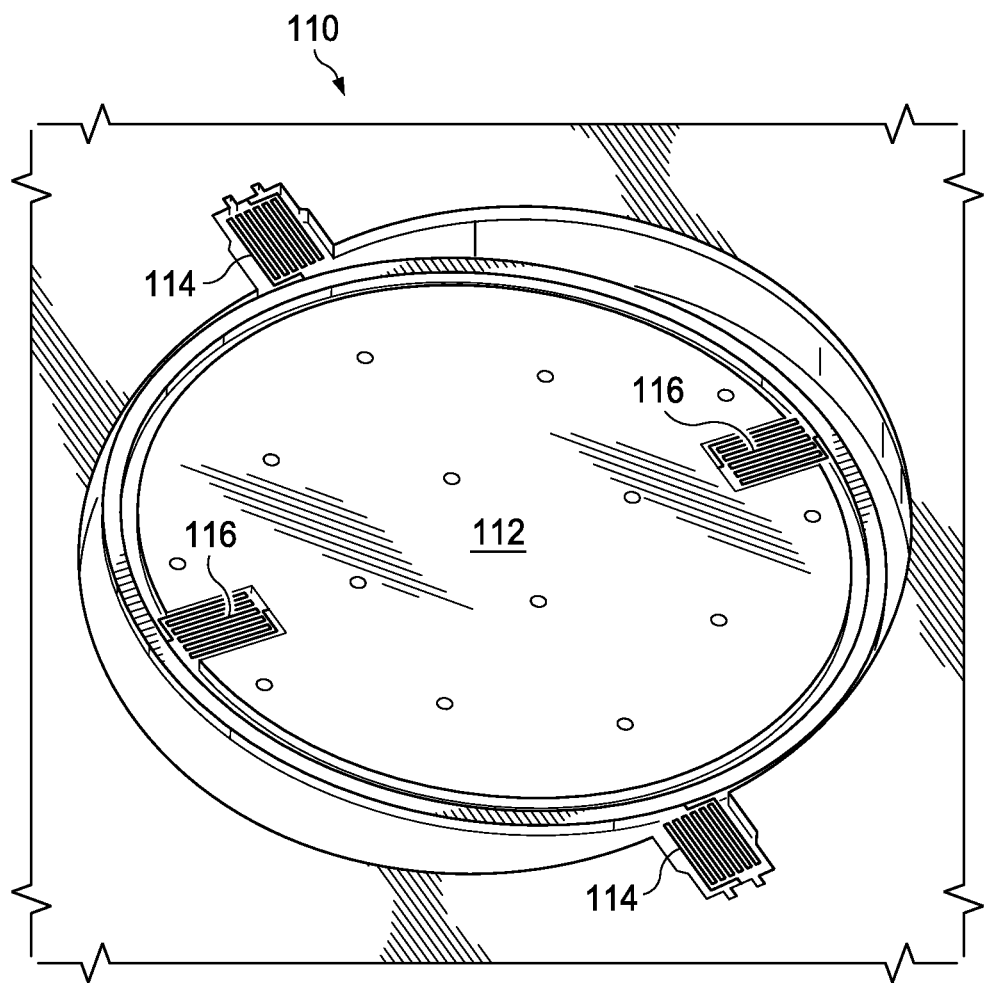
FIG. 2 illustrates an embodiment MEMS minor.

The MEMS minors in MEMS photonic switch 100 are fabricated in a modified silicon wafer process. FIG. 2 illustrates an example MEMS minor structure 110, which may have a diameter from about 550 μm to about 2.5 mm, for example around 1 mm. MEMS minor structure 110 contains minor 112 suspended on two axes of bearings 114 and 116 to allow it to tilt against the torsion spring actions of the bearings, which try to maintain mirror 112 in a particular position. Below mirror 112 for example by about 80 μm to 100 μm for a 1 mm mirror are three or four segmented plate deflection electrodes. When four electrodes are used, each electrode is associated with a mirror quadrant. When a voltage is applied to an electrode, minor 112 is attracted towards that electrode by electrostatic attraction, and twists against the spring action of the silicon torsion springs. This deflection may be steered in both angular direction and magnitude by adjusting an applied drive voltage on one or more of the electrodes. Drive voltages may be up to a few hundred volts, with a maximum mirror deflection of five to seven degrees out-of-plane, for a maximum beam deviation of ten to fourteen degrees from the rest state, or a twenty to twenty eight degree peak to peak beam deviation.

Figure 3:
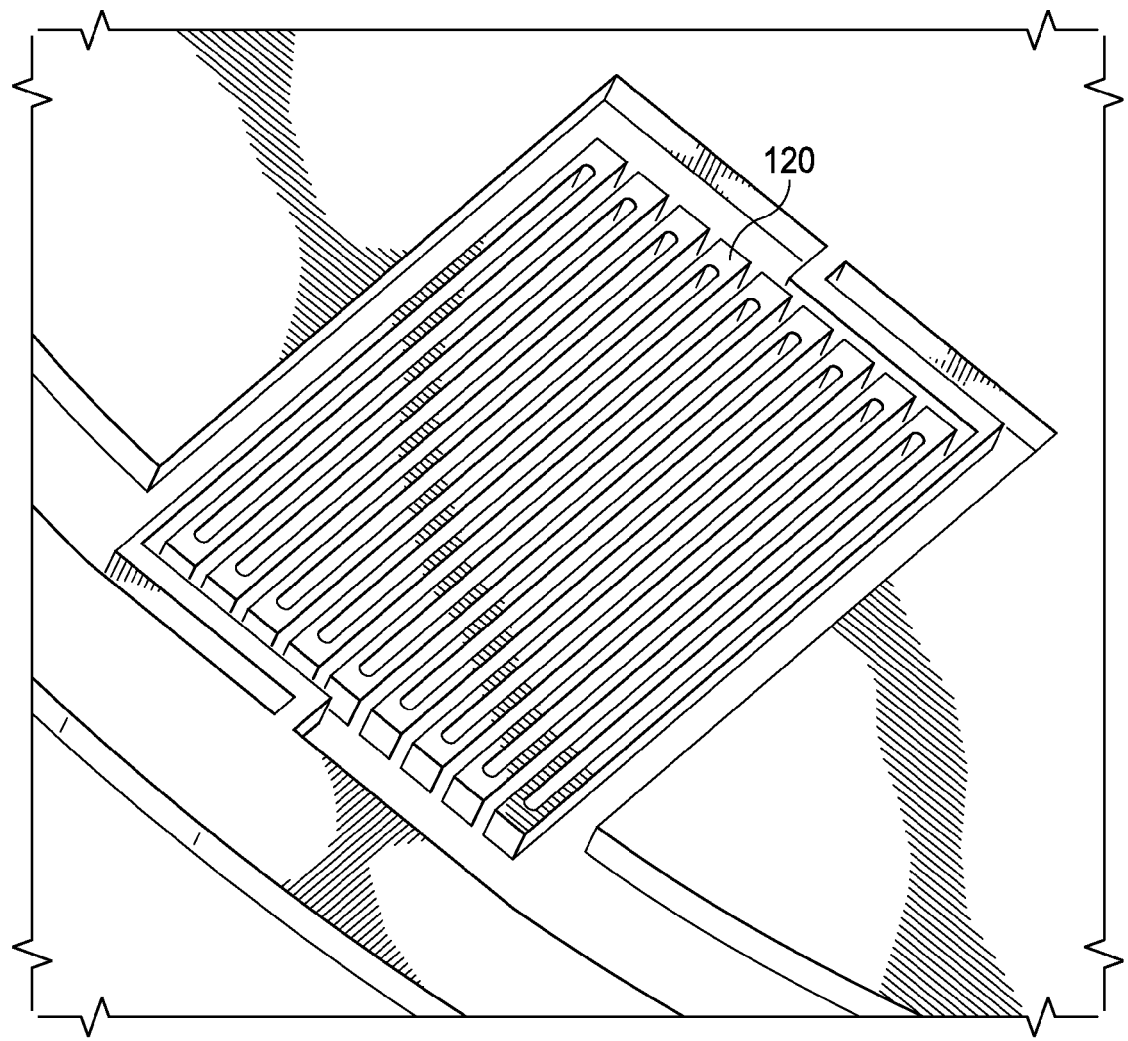
FIG. 3 illustrates an embodiment gimbal for MEMS minors.

FIG. 3 illustrates gimbal 120, an example gimbal that may be used as bearings 114 or bearings 116. Gimbal 120 may be fabricated from silicon torsion springs, which try to return the mirror to its planar position. The attractive force of the drive voltage on one or more quadrant electrodes versus the increasing spring tension forces as the minor is moved determines the final pointing angle of the minor.

Figure 4:
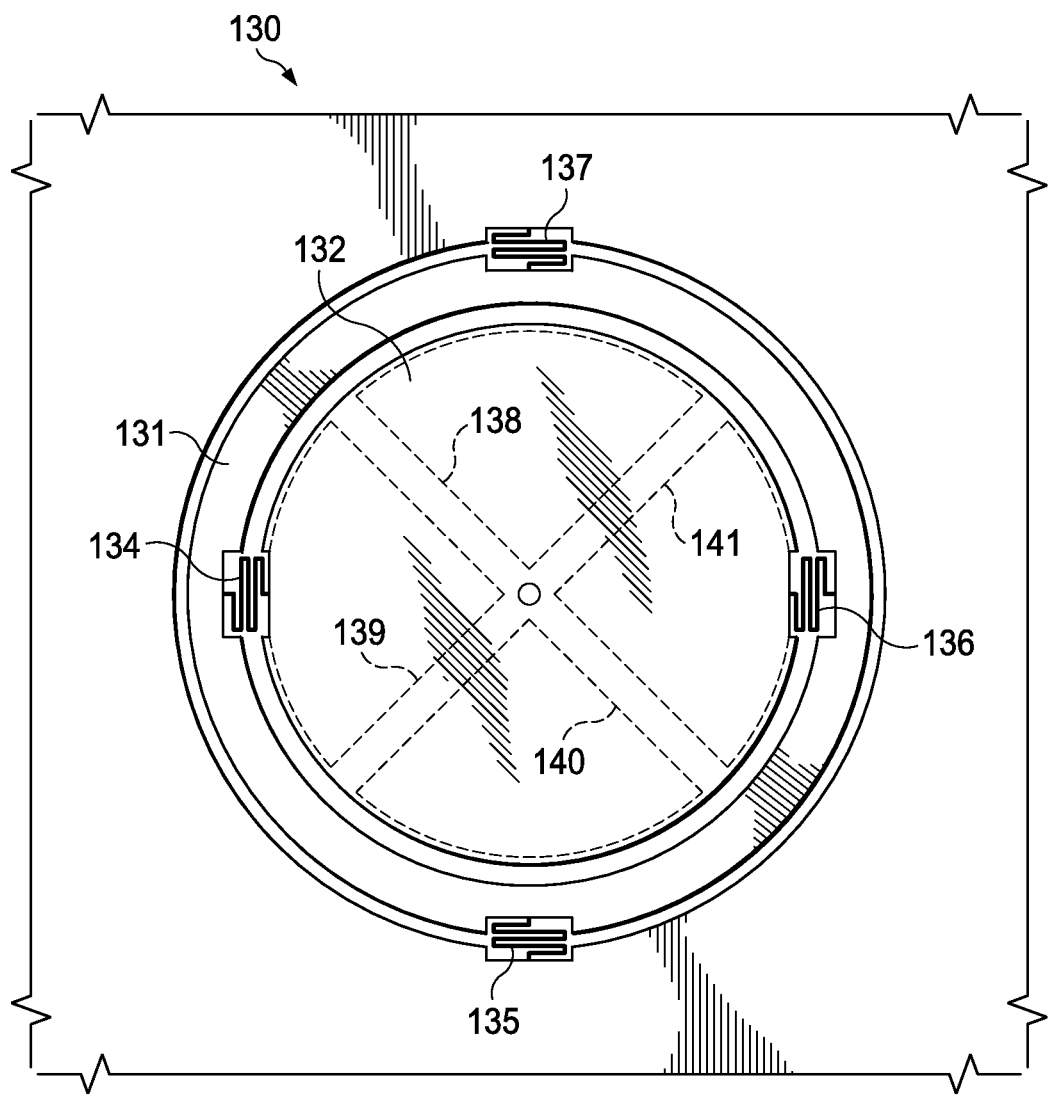
FIG. 4 illustrates an embodiment MEMS minor.

FIG. 4 illustrates mirror structure 130, which contains gimbaled moveable mirror 132 supported by a gimbal ring 131 with y-axis pivoting and x-axis pivoting. Movement in the x-axis is facilitated by springs 135 and 137 which act as pivots, and movement in the y-axis is facilitated by springs 134 and 136, which act as pivots in the orthogonal axis.

The deflection angle of the minor is adjusted along these two axes, formed between springs 135 and 137, and between 134 and 136 by using quadrant electrodes 138, 139, 140, and 141. Applying a drive voltage to electrode 138 causes the mirror to be attracted toward that electrode, causing the minor to twist against the spring action of springs 134 and 136, torsion springs, until the attractive force of the electrodes is balanced by the torsion force of the spring, resulting in a positive y minor deflection. In a similar manner, drive voltages applied separately to quadrant electrodes 139, 140 and 141 can produce a negative y, positive x or negative x deflection. The attractive force is proportional to the electric field, which is given by the potential difference between the minor and the electrode divided by the gap between the mirror and the electrode. Hence, for a ground potential mirror, the polarity of the electric filed, and hence the drive voltage on the mirror is insignificant, and the opposite pairs of electrodes are not driven differentially. However, one of the electrodes in the x-axis and one of the electrodes in the y-axis can be driven to produce deflection angles containing any combination of x and y components. The minor can be pointed to "all points of the compass" by a suitable combination of x and y electrode drive voltages.

The alignment of mirrors in MEMS photonic switches may be controlled by analyzing the output light. Until the output port receives at least some light from the input port, light cannot be detected, and therefore alignment cannot be optimized. Thus, it is desirable that an initial blind connection be set up to achieve some light on the output port. This can be achieved by a complex method involving pre-measurements of deflection voltages required to produce specific deflection angles and a cyclic hunting approach, known as precession. These values are stored for future reference and use. During the MEMS array/module manufacturing process or equipment field commissioning, each MEMS minor in each array is linked to every minor in the opposing array by a trial and error approach. The x and y drive voltages are ramped around the expected drive voltage until a connection is made. The x and y drive voltages for connecting each mirror to every mirror on the opposing minor array are then stored. This is a time-consuming activity, and can generate large tables of values. Hence, using an analog drive, analog angle deflection system, the initial manufacturing or commissioning setup uses drive voltages to link every other mirror in the array. A detailed look-up table with drive voltages for the alignment of each minor of one minor array with each minor on the opposing mirror array may be created in this manner, either during manufacturing testing or as part of a commissioning process and stored in memory. Alternatively, when an extremely consistent minor deflection sensitivity is combined with a complex precision computation algorithm, the initial approximate drive voltages can be computed directly.

Once the minor pair connectivity has been approximately aligned, such that light passes over the path from the input to the output, but the optimal performance has not been obtained, detection of output power indicates that the link has been acquired. However, the acquired link is not optimized, and partial illumination of the face of the output collimator (or of the second mirror) will produce an output—but with significant impairment. Hence, the connection may now be optimized. This optimization involves moving the mirrors to the point of the lowest path loss. Once the optical path is acquired, a low optical power indicates that the path is not optimized. However, this only provides an approximate indication of the amplitude of the error, and provides no information about the direction of the error.

A control design may be used to align mirrors by applying precession in an orbital movement to the mirrors by superimposing a small level of sine wave and cosine wave modulation to the x and y plate drive voltages, respectively. This causes the mirror positions to very slightly precess around their nominal position, causing minor circular modulation of the minor angles. The output light has an amplitude modulation at the precession frequency. The amplitude of this modulation provides an estimate for the size of the error, while the phase of the modulation indicates how much of the error was contributed to by the sine wave modulation and how much was contributed to by the cosine wave modulation. A correction vector may then be calculated to better align the minor pairs. By using different precession frequencies for the opposing mirror arrays, measurements of the frequency of the precession signal indicate which minor needs to be corrected. Alternatively, precession may be performed separately and sequentially on each mirror array. The latter method has a longer optimization process.

An initial approximate alignment may be based on a look-up table with drive voltages for aligning each mirror of one minor array with each minor of the opposing mirror array. The look-up table is extremely large. For example, for a MEMS photonic switch with 1000×1000 minors, there are four million entries in the look-up table with 1000 mirrors per array multiplied by 1000 x-angle drive voltages and 1000 y-angle drive voltages per minor, multiplied by two arrays. Then, coarse orbital precession may be performed, until an initial alignment is established and there is a significant amount of output light. Next, fine precession is performed to optimize the alignment. Periodic in-service fine precession is performed to maintain alignment during operation.

During initial alignment, when the initial alignment of the minors does not produce any light on the desired output port alignment or insufficient light is on the desired output port, the precession signal may be ramped up, causing the mirror angle to spiral outwards around the initial angle, eventually producing light on the desired output in coarse precession. The timing and phasing of the output signal may be used to compute a correction vector. Once the optical path is approximately aligned on the output port, fine precession at a lower precession amplitude, combined with measuring the amplitude and angle of modulation of the output light, may be used in a control loop to further align the minor pair.

Figure 5:
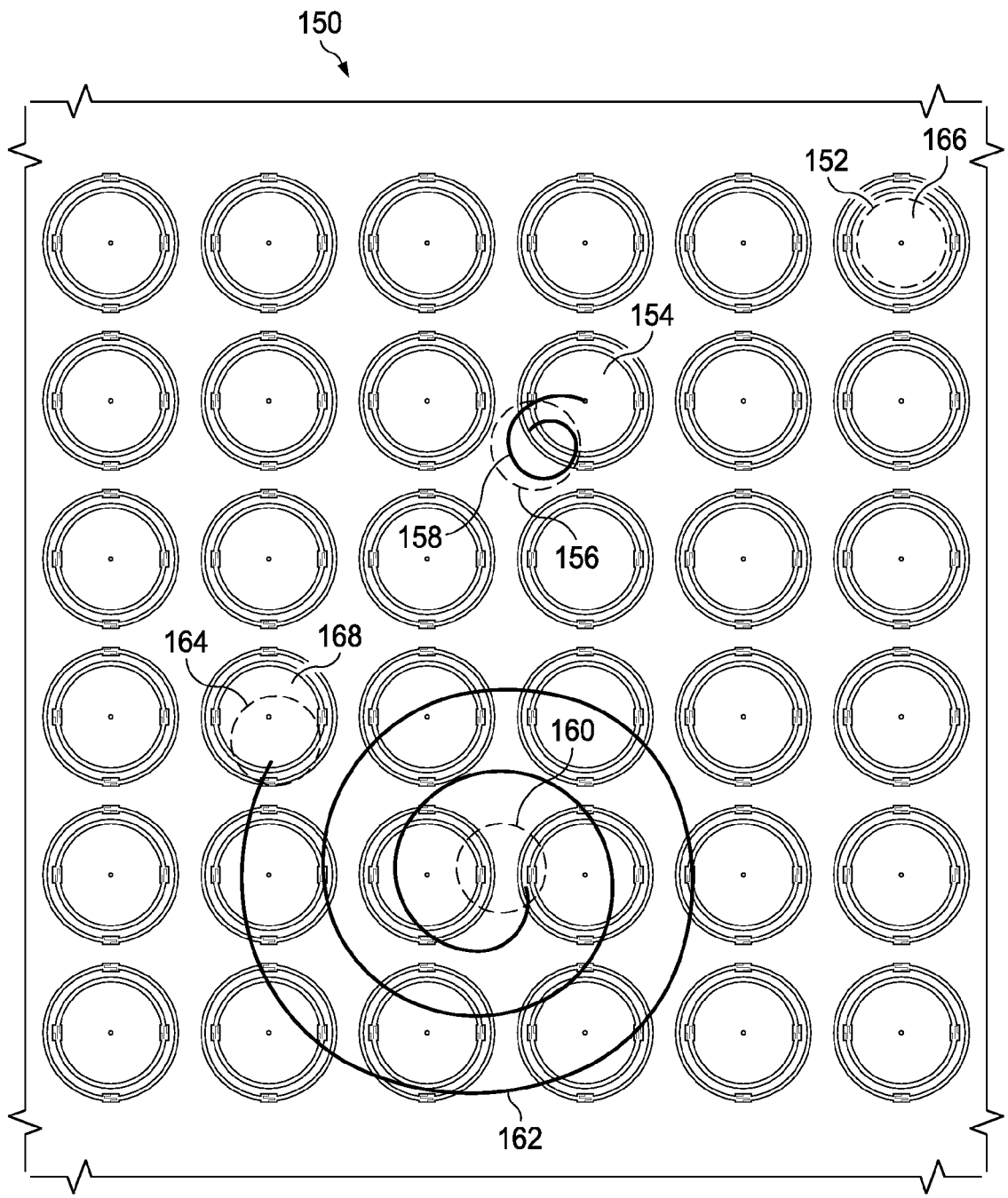
FIG. 5 illustrates beam spots on an embodiment array of MEMS mirrors.

FIG. 5 illustrates minor array 150. Initially, light beam 156 falls partially outside of target minor 154. The light beam angle is varied in precession pattern 158 using fine precession to align it on target minor 154. Also pictured, light beam 152 is properly aligned on target minor 166.

Light beam 156 was initially aligned from a precise look-up table with a small error. For a 100×100 minor array, a look-up table has to store the x axis and y axis drive voltages for each mirror in a minor array to point at each mirror of the opposing array has a table of 2*100*100*2=40,000 drive voltage levels. For a 1000×1000 minor array, there are 4 million drive voltage measurements. Additionally, it is time consuming to determine the look-up table entries, and the look-up table does not take into account drift or aging. As devices age, these the drive voltages may shift, leading to a more approximate initial alignment. When the initial alignment drifts far, some level of coarse precession may be used. Alternatively, a mechanism to automatically update the table contents with the latest values from the actual optimized settings may be used. This may be problematic when the period between the uses of a particular minor pair combination is very large. The initial look-up table values are generated by measuring them at manufacturing or commissioning. About ten to thirty values may be measured in a second, leading to a 1300 to 4000 second measurement for a 100×100 array, and a 130,000 to 400,000 seconds (35-110 hours) for a 1000×1000 array.

When the light from the initial blind minor positioning falls far from the desired minor, a larger spiral pattern may be used with coarse precession may be used before fine precession. Light beam 160 is initially aligned using an approximate calculation or from a look-up table with a large error. Light beam 160 is a few minor lengths away from, not close to, target minor 168. The light beam is precessed using spiral pattern 162, until light beam 164 is close to target mirror 168. Spiral pattern 162, as pictured, is coarser than a spiral that would actually be used for coarse precession for illustration. After coarse precession, a smaller precession pattern is used to better align the mirror pairs. If a precession rate of 1-2 kHz is used for one minor, a precession rate of about 50 Hz or a non-harmonic frequency in the 1-2 kHz range is used for the opposing mirror. This may be a long process that crosses several non-target minor sites, because all combinations of both minor precessions may be needed for the optical beam to illuminate the target minor to correctly point and couple that light beam into the output collimator.

Using coarse precession and fine precession may be complex. Also, the control loop may be slow. The control loop has to acquire an optical signal before it can set up optical connections. The precession frequency is at a low frequency that the mirrors can follow without a significant positional lag, for example from about 300 Hz to less than about 2 kHz, limited by the fidelity of the MEMS minor movement staying in phase with the modulation, with a slow control loop and a relatively long optical path optimization time, for example tens or hundreds of milliseconds. The control loop is low bandwidth. When the mean position of the minor is controlled by a fast-edged drive signal the mirror position experiences ringing or bouncing. The effects of vibrations are not controlled, because their high frequencies of from about 1 kHz to about 10 kHz are largely outside the control loop bandwidth. Hence, the application of a drive signal should be sufficiently slow to avoid triggering this mechanical resonance. This limits the switching speed as well as the precession speed, since the relationship between the precession signal phase and the minor angular pointing phase is very uncertain near a mechanical resonance. To extract a sufficiently large precession envelope signal, significant optical power should be available at the switch output, which may limit the lower end of the dynamic range of the optical power switched through the fabric.

The optical signal used in coarse and fine precession from an external source may contain any form of data modulation, since it may be a modulated traffic signal, with a high level of broadband spectral components to its modulation. Using this optical signal to control and correct the mirror settings during alignment or to monitor and correct tracking activity once the minors are aligned, may be problematic. Any traffic modulation component of the optical signal power at a frequency close to the minor precession frequency may mimic a detected precession error, causing an unnecessary and inaccurate resetting of mirror angles. This leads to error conditions in the control system or a high interferer to precession component levels and possible degradation or loss of control. Because the form of the traffic information and its modulation is unknown, the band-limited noise contribution from the part of the carrier signal spectrum that falls within the pass band of the precession modulation control system is unknown. Hence, the control circuit is designed to be as low bandwidth as possible to minimize the potential for interference from traffic spectral components, leading to slow detection of precession signal changes and slow operation.

An embodiment uses arrays of collimators coupled to two opposing arrays of MEMS minors. A control source with a wavelength different than a traffic wavelength is used for set up and in-service monitoring and optimization of a control path. Photodiodes are integrated or hybridized into the MEMS minors so optical power may be detected in various parts of the minor surface. Photodiodes may be positive-intrinsic-negative (pin) diodes, positive-negative (pn) diodes, avalanche photodiodes, or metal-semiconductor-metal (msm) photodiodes.

Figure 6:
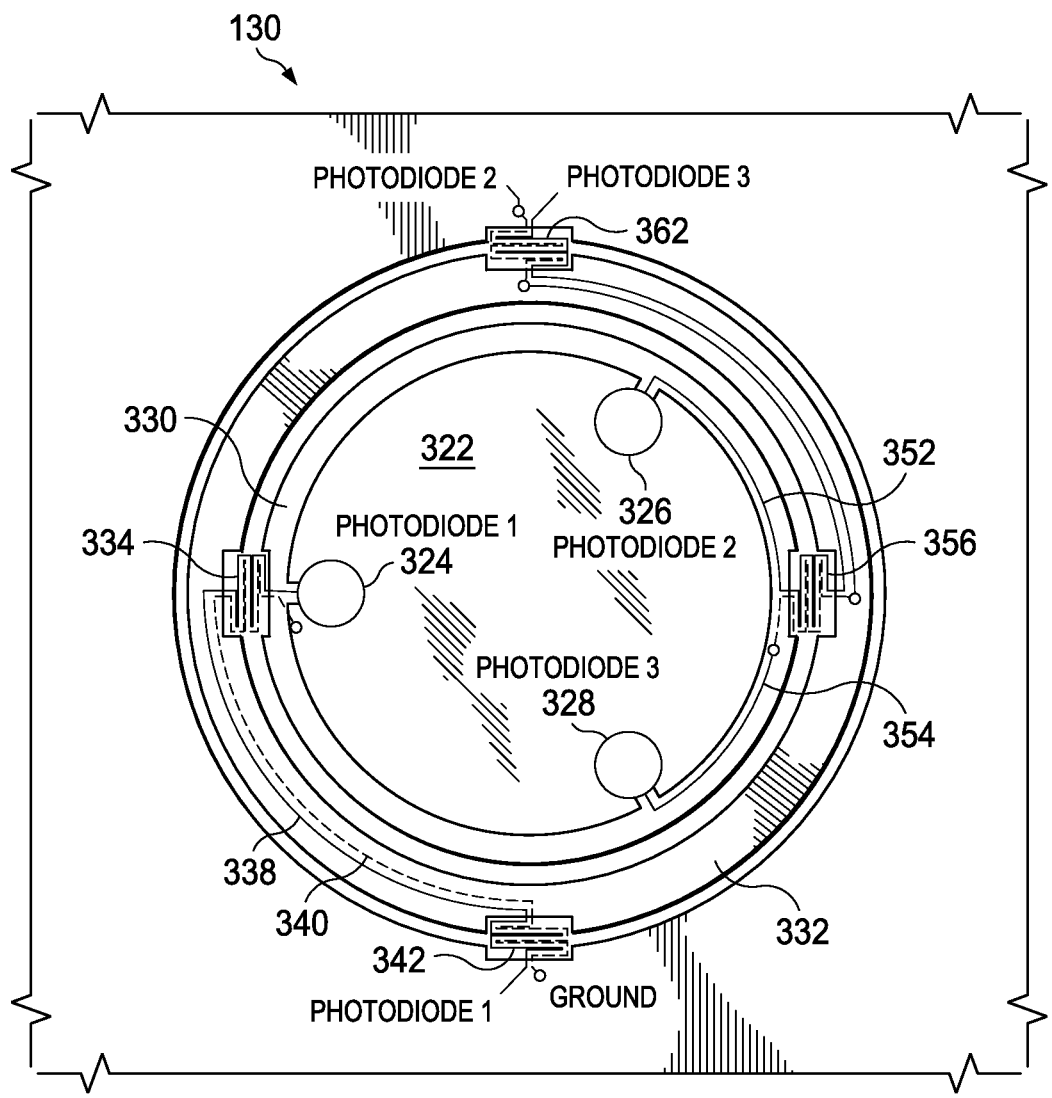
FIG. 6 illustrates an embodiment MEMS minor structure with mirror photodiodes.

FIG. 6 illustrates a MEMS minor with integrated photodiodes on the minor surface. Photodiodes 324, 326, and 328 are placed on the surface of mirror 322. Photodiodes 324, 326, and 328 may be silicon devices integrated into mirror 322. Track 340 for ground and track 338 for photodiode 324 pass along isolation region 332, across the upper and lower surfaces of spring 334, along isolation region 332, and across the upper and lower surfaces of spring 342, where they may be tracked out. Similarly, track 352 for photodiode 326 and track 354 for photodiode 328 pass along isolation region 330, across the upper and lower surfaces of spring 356, along isolation region 332, and across the upper and lower surfaces of spring 362, where they may be tracked out. In an example, an isolation coating in regions 330 and 332 is used to isolate the tracks from the substrate, and is composed of a dielectric material. Alternatively, a thermally grown $SiO_2$ or a high resistivity intrinsic substrate, such as intrinsic silicon (230, 000 ohm-cm) is used. The tracks may be made of gold or aluminum. Springs 362, 334, 342, and 356 may be Si torsion spring with one electrical connection per side. Thus, each spring transmits two signals, including ground.

In another example, two tracks per spring surface are used, doubling the number of tracks that may go across the spring. Seven photodiodes may be placed on a MEMS minor with four springs.

In an additional example, a digitizing chip is placed on the back of the mirror. A large number of photodiodes may then be placed on the mirror, with only three tracks being traced out, for power, ground and a digitized multiplexed photodiode signal stream. In some embodiments, the signal feed may be along the power line, reducing the connections to two, one per spring for each spring-pair.

Figure 7:
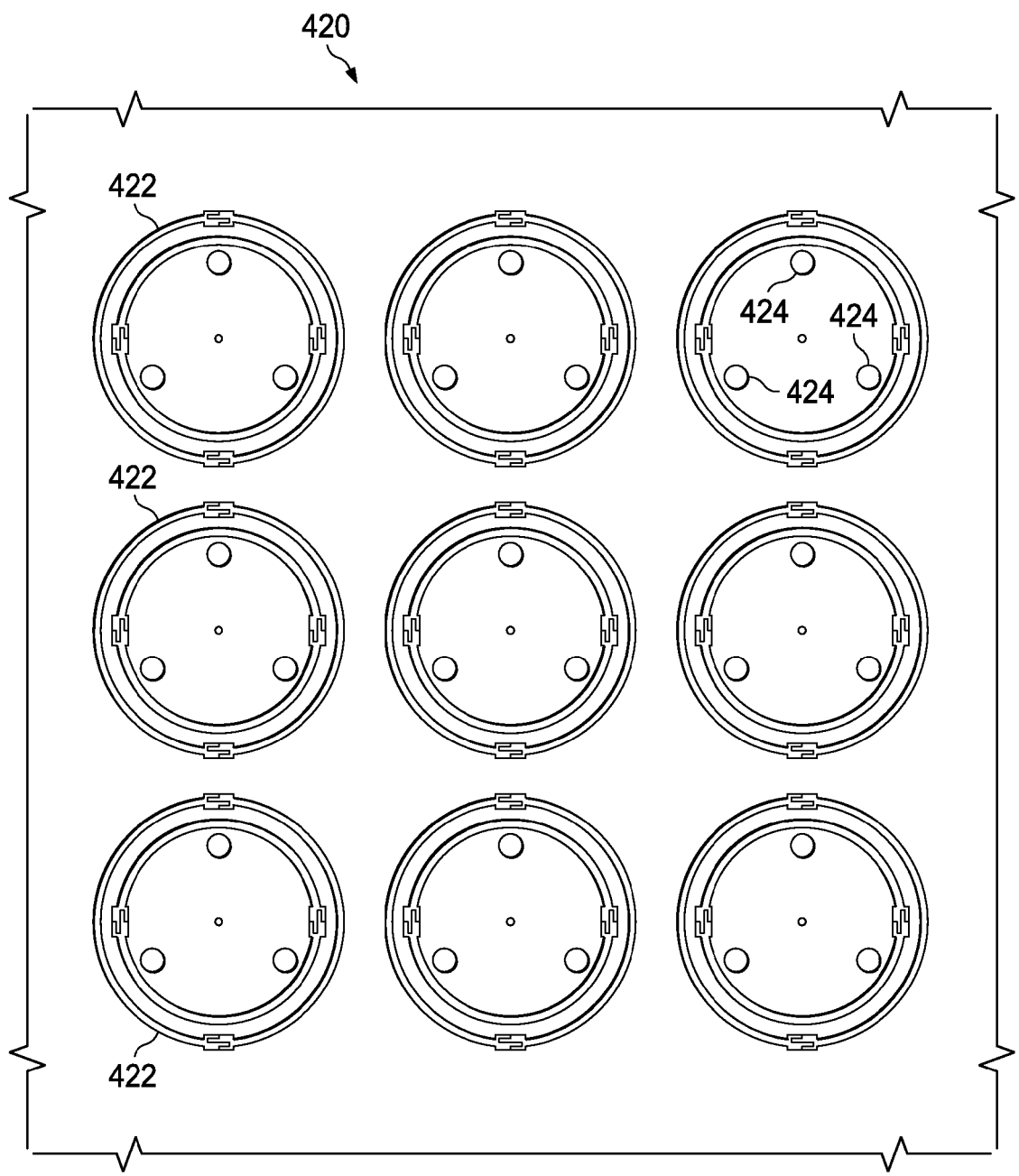
FIG. 7 illustrates an embodiment array of MEMS minors with minor photodiodes.

FIG. 7 illustrates MEMS mirror array 420 of MEMS mirrors with photodiodes integrated on the minor surface. MEMS minor array 420 contains MEMS mirrors 422, with photodiodes 424 integrated on the surface of the mirrors.

Figure 8:
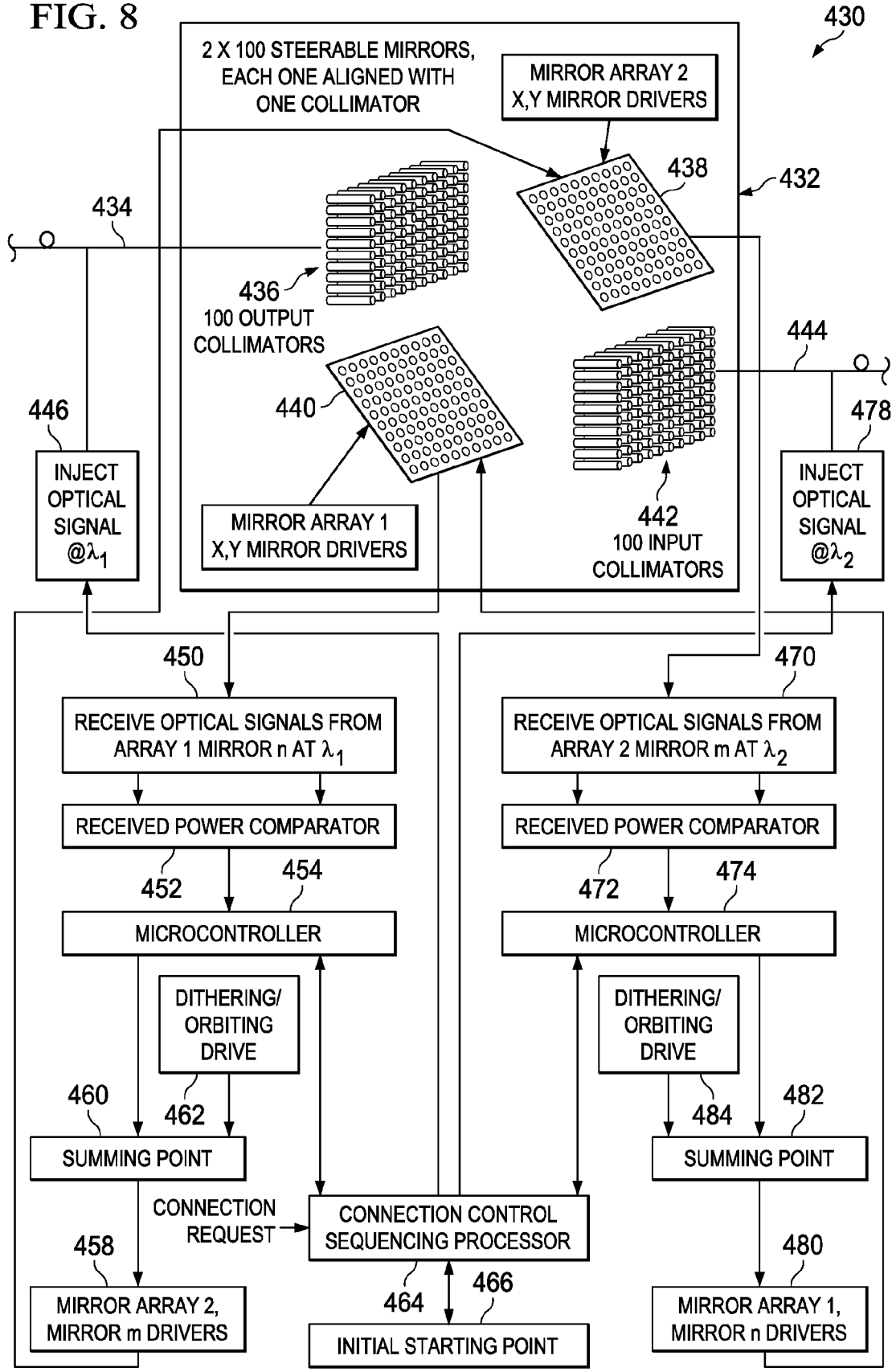
FIG. 8 illustrates an embodiment control structure for aligning MEMS mirrors with minor photodiodes.

FIG. 8 illustrates system 430 for aligning MEMS mirrors with photodiodes integrated on the surface of the minors. System 430 contains MEMS module 432. Light is coupled along fiber 434 to collimators of collimator array 436. The light is projected onto minors of mirror array 438, where it is reflected to minors of mirror array 440. Finally, light exits through collimators of collimator array 442 to fiber 444. Light may also propagate in the reverse direction, from fiber 444 to collimator array 442, reflected off of mirrors of minor array 440 and minors of mirror array 438 to collimator array 436, and out fiber 434. Mirrors of minor array 438 and minor array 440 contain photodiodes integrated on the minor surfaces.

Control light is injected by inject optical signal block 446 and inject optical signal block 478 at a control wavelength. The control wavelength is different than the traffic wavelength of the traffic light. The control light may be derived from a single optical source or sources at nominally the same wavelength, where the control wavelength is approximately the same for both directions. Alternatively, the control wavelengths are different non-service wavelengths in the two directions. For example, a control wavelength of 1480 nm may be used, between the 1310-1350 nm telecommunications band and the 1520-1580 nm telecommunications band. In other examples, 980 nm or 850 nm wavelengths may be used for the control wavelength. Wavelengths from two separate bands may be used for the counter propagating control beams. Two similar or different wavelengths from the same band may be used for the counter propagating control beams. The control sources are used to align one of the mirrors to the correct pointing angle by measuring the location of the reflected beam on an opposing mirror by measuring signals of the photodiodes on the opposing mirror.

There are two optical alignment sources which are injected from opposite sides of the system, and which counter-propagate. The minors, and hence the photodiodes, are illuminated by two control beams, one propagating in each direction. When a control beam is applied by the opposing mirror, the change in light levels is determined. The optical alignment source is injected into the fibers, for example using an optical combiner. The optical alignment source may be one or more lasers, but not necessarily a dedicated laser, since the control power may be low relative to a laser's power output. Thus, one laser may drive multiple inputs via an optical splitter. The optical propagation in a fiber is single mode at both the traffic wavelength and the control wavelength.

To form a connection, a connection request is receive by connection control sequencing processor 464. The connection request may be, for example, in the form of "connect input port n to output port m." Connection control sequencing processor 464 determines the appropriate mirrors to connect. Also, based on input from initial starting point block 466, connection control sequencing processor 464 determines the appropriate angles for the minors to be set in the x and y planes. The angles may be determined using a precision look up table of drive voltages to be applied, which have been measured during manufacturing or field commissioning, and are stored in non-volatile memory. Alternatively, the initial pointing angle is derived from an angle and drive voltage algorithm based on the geometry of the switch and the drive voltage/deflection characteristics of the mirror arrays. The initial pointing may or may not cause some light fall on the target minor, and hence a photodiode on the target mirror.

The signals from the photodiodes are received by receiver 450 and receiver 470. The power changes received by the photodiodes on the mirror are compared in comparator 452 and comparator 472. In one example, only photodiodes on the target minor are compared. When light from the opposing port is received on at least one photodiode on the target mirror, the microcontroller associated with that mirror, microcontroller 454 or microcontroller 474, performs optimization.

When the initial pointing does not produce an output change from a photodiode on the target mirror, microcontroller 454 or microcontroller 474 reports the lack of signal acquisition to connection control sequencing processor 464. Then, orbiting may be performed by orbiting/dithering driver 462 or orbiting/dithering driver 484. The orbiting control voltage is passed to summing point blocks 460 or 482, and to minor array drivers 458 or 480, which drives the mirrors on the opposing mirror array. Orbiting is the application of a slowly ramping sine-wave modulation and cosine-wave modulation is applied to the deflection electrodes of the minor, causing it to slowly increase the level of orbiting (an outward spiral). Hence, the reflected beam is spiraled out from its initial landing site on the array associated with the minor. At some point, the beam sweeps across at least one of the photodiodes on the target minor. This occurrence is immediately flagged to connection control sequencing processor 464, which notes the amplitude and phase angle at the time. These values are used as corrections to the minor drive. Orbiting differs from precession in that it uses direct detection of the instantaneous beam position on the substrate, rather than measurement and computation of phase angles of output modulation on the collimator output signals.

When the initial beam landing site is significantly removed from the target minor, the beam may impinge on some photodiodes of another mirror, disrupting that path. This may be avoided by establishing the worst case initial aiming error, which may be expressed in terms of minors within N mirror pitches of the target minor, where N is derived from the initial pointing processes accuracy. There may be a low value for N when a large look up table is used and a larger value for N when an algorithm is used. A zone of uncertainty is created within N minor pitches of the target minor. Minors opposing mirrors within the zone of uncertainty are locked during the initial alignment. The diodes within the zone of uncertainty other than the diodes on the target mirror do not influence their links during the duration of this initial alignment. The locking may last about 3.0 ms, much shorter than the angular drift timescale of MEMS mirrors under static drive, which tends to be measured in months, years, or decades. This ensures that, if precessed beams walk in to a target minor crossing another minor that is in-service, will not disrupt the pointing of that mirror. Normal mirror control is restored when the initial alignment is completed.

When some light falls on both of the opposing target mirrors, microcontroller 454 and microcontroller 474 take over the optimization process. The signals from the photodiodes on the target minors are compared. The relative additional power of the illumination of the photodiodes is measured, and a correction vector is calculated if necessary. In one example, the photodiode with the most additional power is determined, and the beam is deflected a small amount along a line from that photodiode to the center of the target mirror. This process is then repeated until the photodiodes are approximately equally additionally illuminated. In another example, a more exact correction vector is determined by measuring the additional power received by each of three or more photodiodes and computing the beam landing placement error using triangulation.

The repeated application of this algorithm causes the deflection drive of the opposing minors to be optimized such that the control light is reflected off the first steerable minor it encounters in both directions, creating a beam that is fully centered on the target minor in both directions. The two directions of control light travel the same path in opposite directions from collimator to collimator, and hence light (e.g. traffic light) entering one collimator exits the other, by optical superposition.

Once optical power from the control beam is detected by photodiodes on the target minor, there is no additional cyclic precession, and the pointing error may be determined from the photodiodes.

In an example, the initial pointing is sufficiently accurate that light initially falls on the target mirror. For example, an accurate look up table may be used. Precession drivers 462 and 484 and summing point blocks 460 and 482 may not be present in this example.

In another example, there is a zone of uncertainty around the target mirror for the initial beam landing spot. This may be, for example, minors from one to five mirror pitches from the target minor. Before the drive voltages are applied, the in-service mirrors opposite minors within the zone of uncertainty are locked. These minors are locked for the duration of the initial alignment. This is achieved by maintaining their current drive voltages and disconnecting their photodiodes from their control loop. Basically, the control loops are locked for the duration of the connection setup. This time is much shorter than the minor drift rate with a fixed applied voltage. Optional beam dithering may also be applied to effectively enlarge the apparent spot size and to ensure detection by a photodiode. The beam lands somewhere within the zone of uncertainty. The photodiodes on the other mirrors within the zone of uncertainty are used to detect the presence of the beam and to facilitate the computation of its landing spot. Once this is determined, a direct correction vector may be calculated and applied to the drive voltages to bring the beam close to being centered on the target minor. Once the target mirror is illuminated, the other mirrors may be unlocked and returned to normal proactive control.

Figure 9:
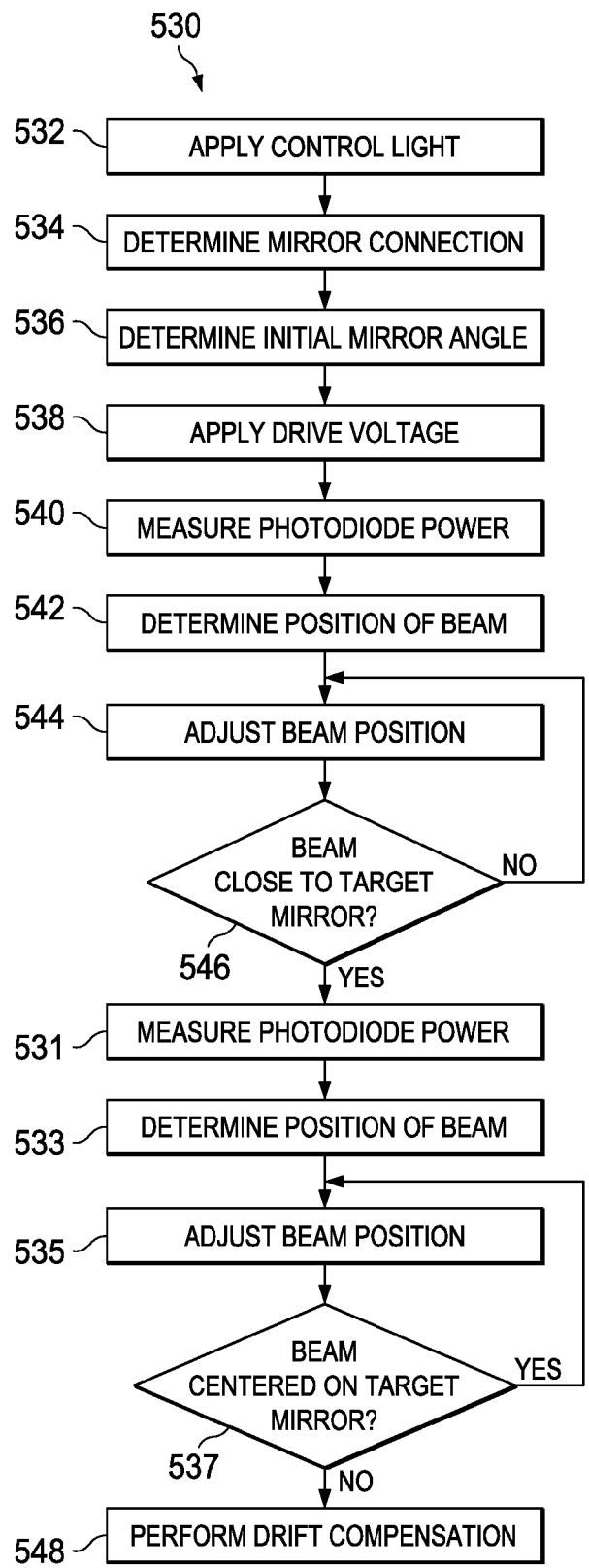
FIG. 9 illustrates a flowchart of an embodiment method of aligning MEMS mirrors with mirror photodiodes.

FIG. 9 illustrates flowchart 530 for a method of aligning mirrors in a MEMS photonic switch with photodiodes on the surface of the MEMS mirrors. Flowchart 530 demonstrates a method for aligning a single mirror of a minor pair on opposing minor arrays. However, the illustrated method may be performed simultaneously on opposing mirrors to be aligned. Initially, in step 532, a control optical signal is applied. The wavelength of the control optical signal is different than the wavelength of the traffic optical signal, so the wavelengths may be distinguished and separated, since the onward propagation of the control signal to remote sites may be problematic.

In step 534, a connection between opposing mirrors on opposing mirror arrays is determined. The mirror connection completes a path from the input collimator to the minor on a mirror array, to minor on the opposing minor array, to an output collimator. Once a connection is aligned, it is available for traffic propagation in both directions.

Then, in step 536, the initial minor angle for the connection is determined. In one example, the initial angle is computed based on the geometry of the minor arrays. In another example, the initial angle is based on values in a simple look-up table. For example, the look-up table is based on calculations based on the rows and columns of the minors.

Next, in step 538, a drive voltage is applied to initially align the mirror. The drive voltage is based on the minor angle determined in step 536.

In step 540, the optical power received by photodiodes is measured. Source mirrors pointing within the zone of uncertainty are locked and the photodiodes within a zone of uncertainty for the target mirror are measured. The zone of uncertainty is determined based on the maximum error in the initial alignment.

The position of the beam landing spot is determined in step 542. In one example, the optical power of the beam is most strongly detected by one illuminated photodiode. The beam position is approximately determined to be at that photodiode. In another example, three or more photodiodes are illuminated by the control beam. The center of the beam is then determined by triangulation. The control beam might not be detected by any photodiodes, for example when the beam falls between mirrors. When the beam is not detected by any photodiodes, or is not detected by sufficient photodiodes, it may be adjusted by approximately half the mirror pitch in both the x and y directions to step from a known sparse photodiode area to a dense photodiode area. Alternatively, orbiting is performed, and the beam landing spot is spiraled until it reaches a photodiode which then records the additional power. In another example, the beam spot is effectively enlarged using dithering.

Next, in step 544, the beam landing spot is adjusted, for example by using a vector from the center of the beam landing spot determined in step 542 to the center of the target mirror. The drive voltage is adjusted to move the beam by this vector.

Alternatively, the effective spot size of the beam landing spot is expanded by applying dithering. Dithering may also be initially applied. The beam may be artificially enlarged during the alignment process by cyclically dithering the mirrors, and hence the beam, causing the beam to fall on more photodiodes. This cyclic dithering is enlarges the apparent beam spot to cover more photodiodes, and may be carried out using much higher frequencies than conventional precession, since no measurement of precession or orbiting angles needs to be made, and hence mirror positional lag is not an issue.

Then, in step 546, the beam position is again determined by measuring the received optical signal of photodiodes. When the beam is not sufficiently close to the target mirror, for example when only one photodiode or no photodiodes were previously illuminated, the beam position is again adjusted in step 544. When the beam is sufficiently close to the target position, the system proceeds to step 531.

The optical power is measured by photodiodes on the target mirror in step 531. If dithering was used, it is turned off for the fine alignment. Once the beam spot lands on the target mirror, dithering is not used.

Next, in step 533, the position of the beam landing spot is determined. This is done based on the signals from photodiodes on the target mirror.

In step 535, the beam position is adjusted based on the beam position determined in step 533. A vector is calculated from the center of the beam landing spot to the center of the target mirror, and the beam is adjusted by that amount. This may be done by triangulation of three or more photodiodes. Alternatively, the beam is nudged towards the center from the photodiode that detects the most power.

Then, in step 537, it is determined whether the beam position is sufficiently aligned to the target mirror. When the beam is not sufficiently aligned to the target mirror, the beam position is again adjusted in step 535. When the beam is sufficiently aligned, the system proceeds to step 548.

While the mirror connection is in service, drift compensation is performed in step 548. Drift compensation may be performed periodically, or when a potential misalignment is detected.

In an example, a receive optical signal module determines the light that is output through the output collimator. This validates that the process is complete, and there is sufficient light propagating through the switch.

Orbiting or dithering is applied when sufficient photodiodes are not illuminated. For example, no photodiodes are illuminated. Or, in a system that requires three photodiodes to be illuminated for triangulation, fewer than three photodiodes are illuminated. The likelihood of this depends on the mirror-mirror spacing on the substrate and the relative mirror diameter and beam diameter. For larger mirror-mirror spacing the likelihood of losing the initial beam placement between the mirrors is higher, and therefore the likelihood of using beam dithering or precession for initial beam placement is higher. However, to avoid the need for dithering or precession, photodiodes may be placed on the substrate between the mirrors as well as on the mirrors. Additional details on a MEMS photonic switch with interstitial photodiodes are disclosed by the U.S. patent application Ser. No. 13/964,437 entitled "Device and Method for Micro-Electro-Mechanical-System Photonic Switch" filed on Aug. 12, 2013 which application is hereby incorporated herein by reference.

Figure 10:
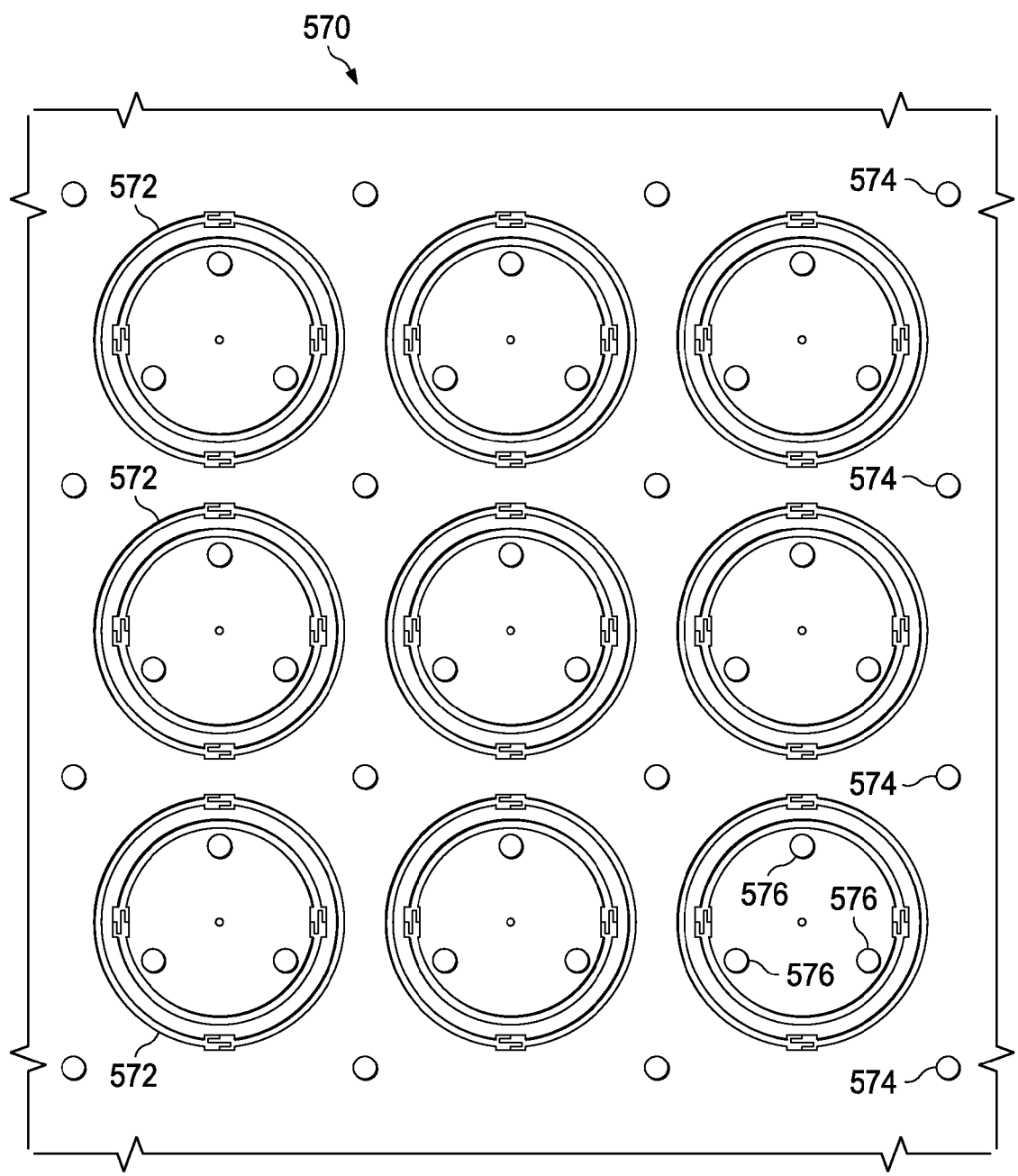
FIG. 10 illustrates an embodiment array of MEMS minors with minor photodiodes and interstitial photodiodes.
Figure 11:
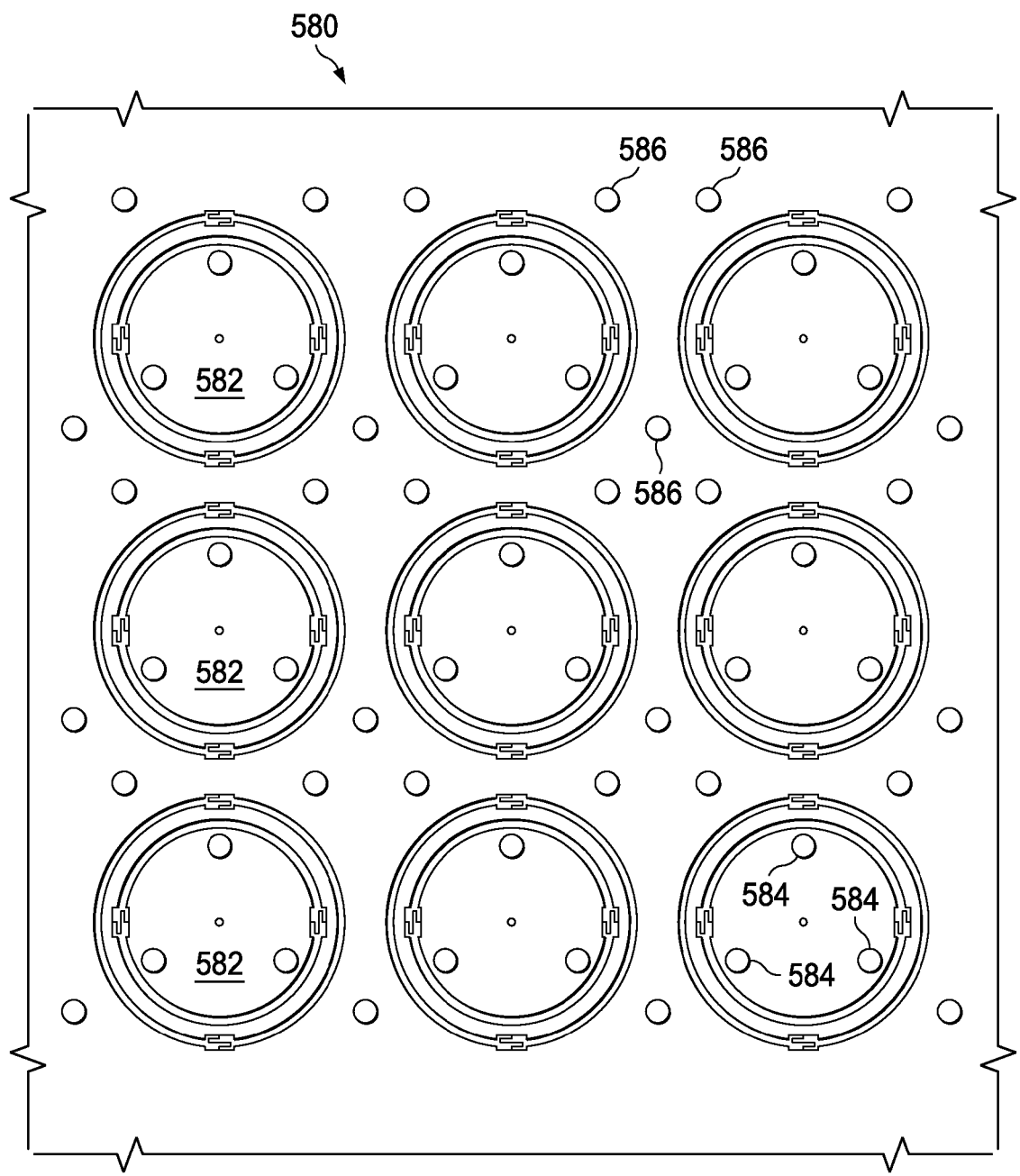
FIG. 11 illustrates another embodiment array of MEMS mirrors with mirror photodiodes and interstitial photodiodes.
Figure 12:
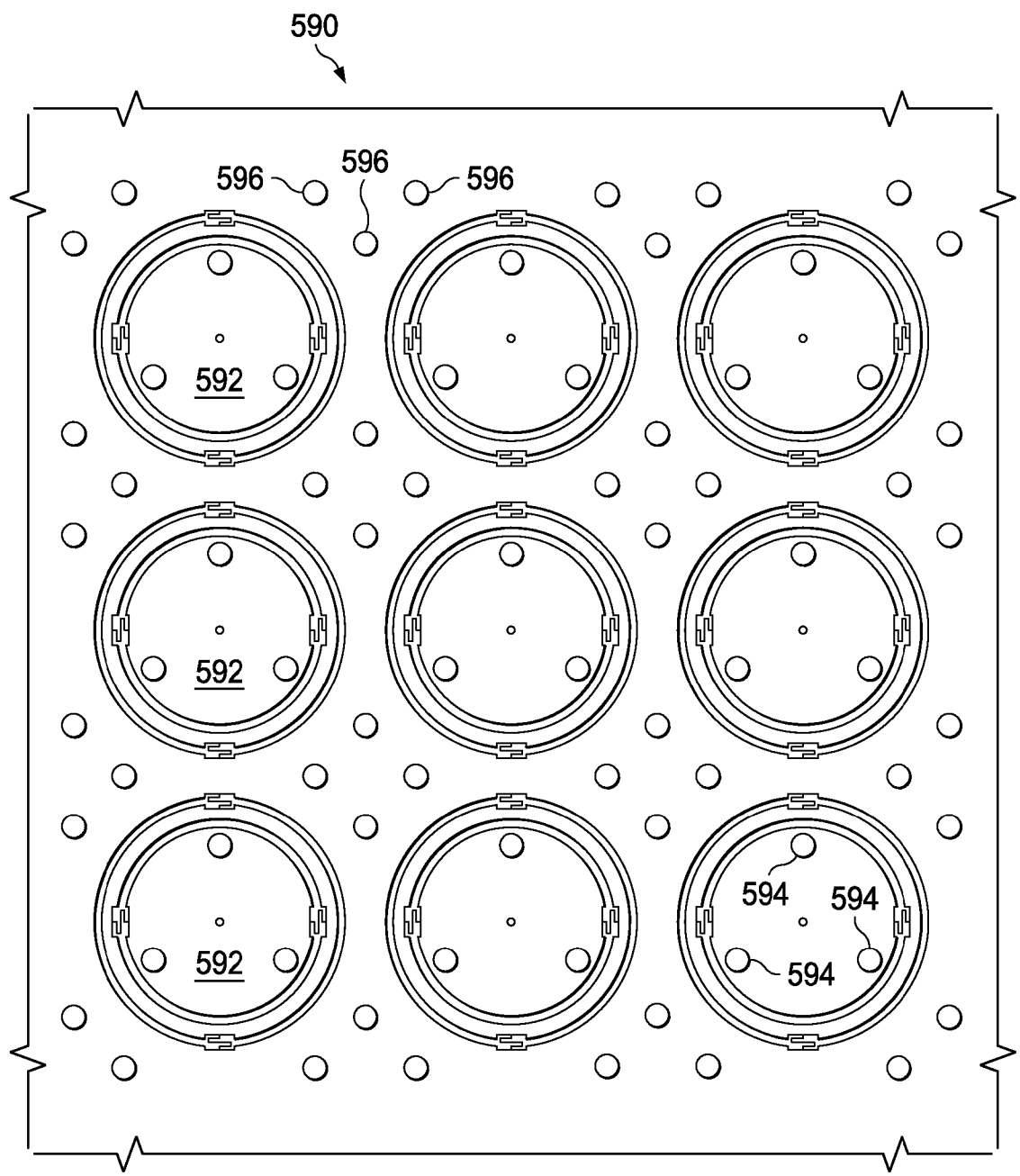
FIG. 12 illustrates an additional embodiment array of MEMS minors with minor photodiodes and interstitial photodiodes.

FIGS. 10, 11, and 12 illustrate photodiodes placed on the substrate between the mirrors in a mirror array as well as on the mirrors. Mirror array 570 in FIG. 10 shows mirrors 572 with photodiodes 576 placed on the surface of mirrors 572 and photodiodes 574 equally spaced between four surrounding mirrors. FIG. 11 shows mirror array 580 with mirrors 582, photodiodes 584 placed on the surface of mirrors 582, and photodiodes 586 placed in a triangular pattern centered equidistant from the centers of the four surrounding mirrors. Also, FIG. 12 shows mirror array 590 with mirrors 592, photodiodes 594 on the surface of mirrors 592, and photodiodes 596 in a diamond pattern centered equidistant from the centers of the four surrounding mirrors. Other photodiode patterns may also be used. For example, more interstitial photodiodes may be used. The photodiodes may be placed in the region between two mirrors rather than centered between four mirrors.

The interstitial photodiodes assist the mirror photodiodes in determining the center of the initial beam placement. This may be determined accurately with three or more photodiode responses and triangulation of the beam site center. When only one photodiode is illuminated by the initial beam landing, its location within the beam spot cannot be determined. While the beam spot distance may be calculated, the direction of the center of the beam spot from that photodiode cannot be calculated. Hence, the photodiode location may be used as the beam location, which leads to a more approximate correction vector. Once light is received by any of the mirror photodiodes on the target mirror, the beam may be walked in to the mirror center.

Figure 13:
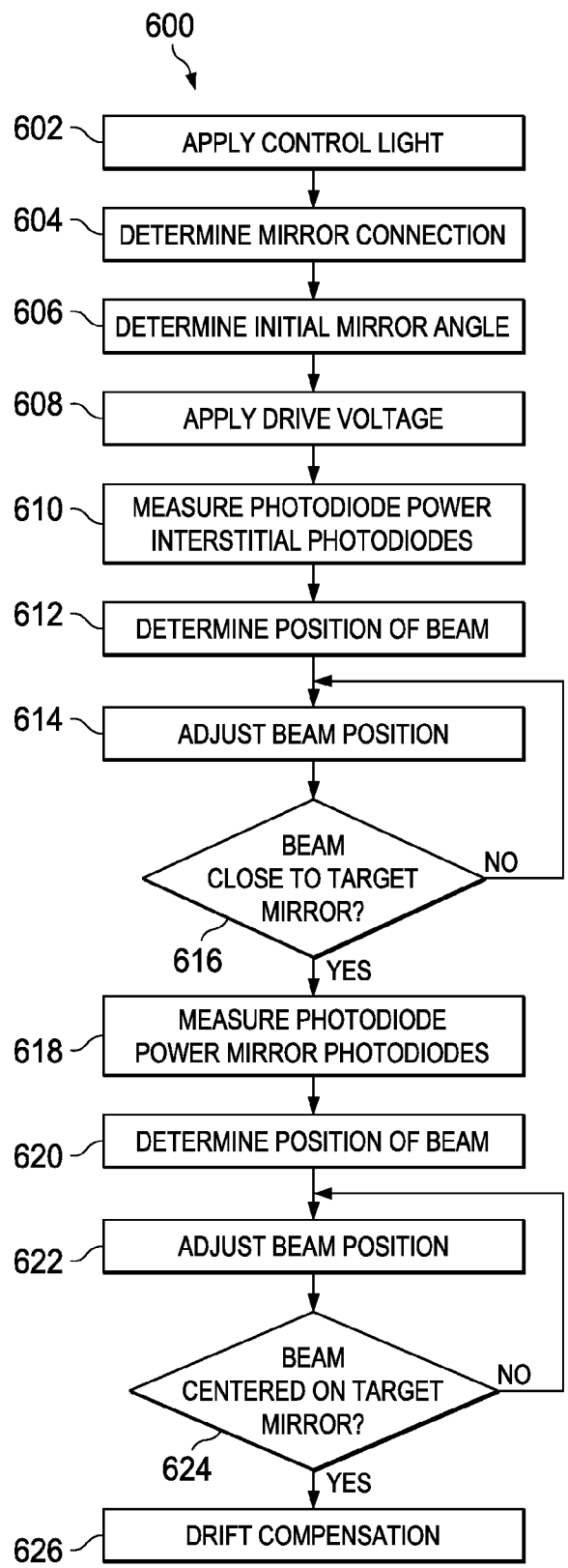
FIG. 13 illustrates a flowchart for an embodiment method of aligning MEMS minors with minor photodiodes and interstitial photodiodes.

FIG. 13 illustrates flowchart 600 for a method of aligning MEMS mirrors with mirror photodiodes and interstitial photodiodes. Flowchart 600 demonstrates a method for aligning a single mirror of a mirror pair on opposing mirror arrays. However, the illustrated method may be performed simultaneously on opposing mirrors to be aligned. Initially, in step 602, a control optical signal is applied. The wavelength of the control optical signal is different than the wavelength of the traffic optical signal, so the wavelengths may be distinguished.

In step 604, a connection between opposing mirrors on opposing mirror arrays is determined. The mirror connection completes a path from the input collimator to the mirror on a mirror array, to mirror on the opposing mirror array, to an output collimator. Once a connection is aligned, it is available for traffic propagation in both directions.

Then, in step 606, the initial minor angle is determined. In one example, the initial angle is computed based on the geometry of the mirror arrays. In another example, the initial angle is based on values in a simple look-up table. For example, the look-up table is based on calculations based on the rows and columns of the minors.

Next, in step 608, a drive voltage is applied to initially align the mirror. The drive voltage is based on the minor angle determined in step 606.

In step 610, the optical power received by photodiodes is measured. Source mirrors pointing within the zone of uncertainty are locked and the photodiodes within a zone of uncertainty of the target mirror are measured. Both interstitial photodiodes and mirror photodiodes are used, so the beam is likely to be detected based on the initial pointing. The zone of uncertainty is determined based on the maximum error in the initial alignment.

The position of the beam landing spot is determined in step 612 based on the signals from photodiodes measured in step 610. In one example, the optical power of the beam is most strongly detected by one illuminated photodiode. The beam position may be approximately determined to be at that photodiode. In another example, three or more photodiodes are illuminated by the control beam. The center of the beam may then be determined by triangulation.

Next, in step 614, the beam landing spot is adjusted, for example by using a vector from the determined center of the beam landing spot from step 612 to the center of the target minor. The drive voltage is adjusted to move the beam by this vector.

Then, in step 616, the beam position is again determined by measuring the received optical signal of photodiodes within the zone of uncertainty. When the beam is not sufficiently close to the target minor, for example when only one photodiode or no photodiodes were previously illuminated, the beam position is again adjusted in step 614. When the beam is sufficiently close to the target position, the system proceeds to step 618.

The optical power is measured by photodiodes on the target minor in step 618. The minors within the zone of uncertainty are unlocked, because the beam is now landing on the target minor.

Next, in step 620, the position of the beam landing spot is determined. This is done based on the measurement in step 618.

In step 622, the beam position is adjusted based on the beam position determined in step 620. A vector is calculated from the center of the beam landing spot to the center of the target minor, and the beam is adjusted by that amount. This may be done by triangulation of three or more photodiodes on the minor. Alternatively, the beam may be nudged towards the center from the photodiode that detects the most power.

Then, in step 624, it is determined whether the beam position is sufficiently aligned to the target minor. When the beam is not sufficiently aligned to the target mirror, the beam position is again adjusted in step 622. When the beam is sufficiently aligned, the system proceeds to step 626.

While the mirror connection is in service, drift compensation is performed in step 626. Drift compensation may be performed periodically, or when a potential misalignment is detected.

Figure 14:
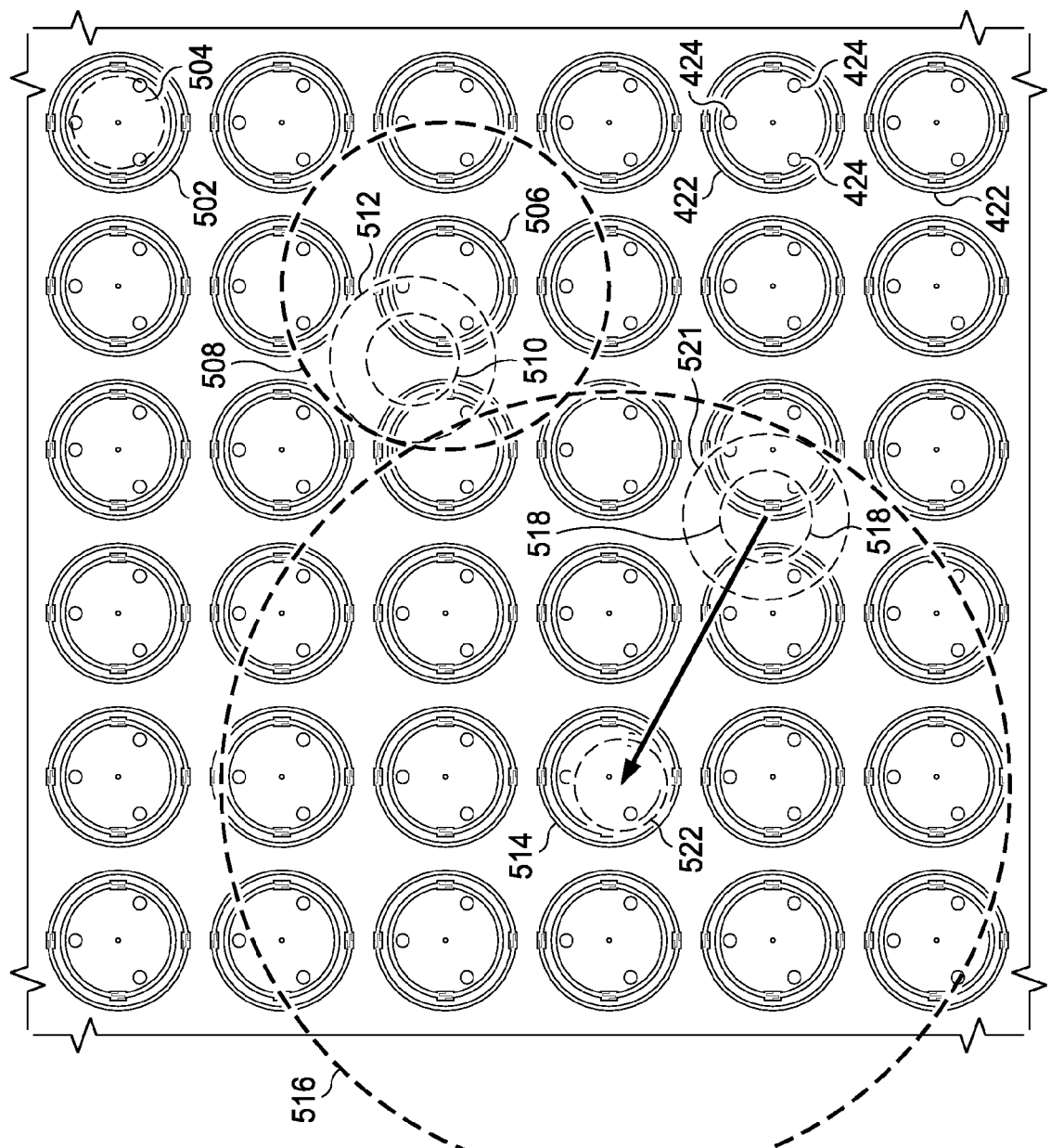
FIG. 14 illustrates beam spots on an embodiment array of MEMS mirrors with minor photodiodes.

FIG. 14 illustrates a minor array with minor photodiodes. Beam 504 is optimally centered on minor 502. A beam is unlikely to be centered in the initial beam placement. FIG. 14 illustrates zone of uncertainty 508, a small zone of uncertainty around minor 506, and zone of uncertainty 516, a larger zone of uncertainty around minor 514. Minors within the zones of uncertainty are locked during the initial alignment. In an example, the minors are locked for about 7 ms.

In one example using a precise method of initial pointing, beam 510 falls within zone of uncertainty 508 of mirror 506, the target minor. The initial beam landing point may be detected by receiving control wavelength optical power by some of the photodiodes in zone of uncertainty 508. The illuminated photodiodes and the relative power levels of the photodiodes are used in the calculation of an approximate correction vector in terms of distance and angle to approximately center the beam on the target mirror. Because the initial beam landing is known to have a relatively small maximum error, for example about a single mirror diameter, the zone of uncertainty over which the other minors are locked momentarily is small, and only four other minors are locked.

In this example, the beam primarily falls on photodiodes to the left of, and somewhat above, the target minor, with most of the additional optical power falling on the photodiode at the eight o'clock position of the target mirror and some falling on the noon position of the target minor and very little on the four o'clock position of the minor to the left of the target minor. The information from these photodiodes enables the determination that the beam landing site should be moved to the right and down as a vector angle, and that it should be moved about a beam diameter to better align it to the target mirror. This calculation may be based on which diode receives the most light and vectoring a small step from this diode's location towards the center of the target mirror. In another example, the vector is calculated by mapping the received powers of all the illuminated photodiodes to a model of the power received as a function of distance from the center of the beam to determine the actual beam center location. Then a precision beam vector is calculated and applied from that location directly to the center of the target minor. Thus, in one step, precise alignment may be performed without the need for an additional optimization cycle. However, optimization maintenance may still be performed to protect against minor drift.

Dithering may be used to ensure that the beam illuminates an adequate number of photodiodes for initial setup. A dithered beam is illustrated by beam 512.

An example with a broader tolerance is shown by zone of uncertainty 516 around minor 514. Initially, beam 518 falls away from mirror 514. Beam 518 is dithered to yield beam 521. A better aligned beam after an initial alignment is shown by beam 522. In this example, the initial pointing has produced an error of a few minor pitches. The photodiodes on the minors opposite the locked minors in the zone of uncertainty respond to the received control illumination. The detected illumination values are used to calculate the center of the actual beam landing site either approximately based on which photodiode receives the most light or more accurately by beam power profile mapping from three or more photodiodes to determine the actual location of the center of the beam. From this, a correction vector is calculated to achieve approximate or accurate alignment with the target mirror, minor 514. The minor drive of the minor on the opposing array is adjusted, bringing the beam close to being well aligned with minor 514. If a detectable error remains, for example if only some of the photodiodes on the target minor are illuminated, or if the photodiodes are unevenly illuminated, a second small scale vector correction may be calculated. This process occurs rapidly. The photodiode output is detectable in tens of microseconds. The slowest part of the adjustments achieving the physical movement of the MEMS minor, which may be a few milliseconds to avoid a sprung mass mechanical resonance within the mirror system.

The initial mirror-mirror acquisition and alignment process optimizes the pointing of each of the two mirrors in the path being set up independently by measuring where the collimated light from their associated collimators falls on the opposing mirror array and adjusting or correcting that location so the first mirror in the new path illuminate the other mirror in that path with light from its associated collimator. When this occurs, the collimated light from the first control optical carrier propagates from its collimator to the first mirror, is reflected at an angle so it is approximately centered on the second mirror to a second collimator. At the same time, collimated light from the second collimator is reflected off of the second mirror, then the first mirror, to the first collimator. A cross MEMS module connection is established.

When there are no photodiodes between the mirrors, the beam diameter may be smaller than the spacing between the photodiodes. The beam may land where it cannot be found because, for example, it lands well aligned to the gaps between the mirrors. Beam dithering may be introduced by putting a low fixed level of positional modulation. Dithering effectively enlarges the beam spot size so it may be detected.

In one example, dithering is always on during the initial mirror acquisition cycle. In another example, dithering is turned on only when the beam cannot be detected after initial mirror deflection angles are set or the beam is not impinging on sufficient photodiodes. When the beam is not impinging on sufficient photodiodes, instead of dithering, an approximate correction may be made using data from one photodiode. Then, the calculation is repeated from the new landing site close to the target mirror, which is likely to illuminate multiple photodiodes. In another example, when the initial beam aiming results in the illumination of no photodiodes, the initial beam aiming may be shifted by approximately half a minor pitch in both x and y direction, which should result in the illumination of multiple photodiodes. Then, a precise vector to the target minor center may be calculated.

Once the initial set up is complete, the microprocessors take over the optimization process. At this stage, some light impinges both of the two opposing target mirrors, but the photodiodes on the minors are unevenly illuminated. For both minors, the relative powers of the illumination of three or more photodiodes may be rapidly measured, and a correction vector is calculated. This vector calculation may take several forms. For example, with three photodiodes at zero, 120 and 240 degrees around the minor, the photodiode with the highest power is determined. The beam is deflected a small amount along a line from that photodiode to the center of the mirror. In this example, the highest reading is from the photodiode at 120 degrees results in the beam being driven a small step along a line at 300 degrees. Then, the process is repeated. A faster optimization may be achieved by measuring all three powers and computing a more exact correction vector based on the beam landing placement error from those three readings. Other optimization algorithms may be used. The repeated application of any of these algorithms causes the deflection driver of the opposing mirror to be optimized so that light is not fully centered on the target minor in both directions. The light in both directions travels the same path, but with a reverse direction. When alignment is completed, the path is optimized in both directions.

The optical power of the control beam may be relatively low. If a positive intrinsic negative (PIN) diode receiver is used with a control optical bandwidth of 100 kHz, an optical beam width of 1 mm, and a photodiode effective diameter of 25 μm, an optical beam power of from around −15 to −20 dBm is an appropriate power level. This power may be achieved with a low cost laser feeding multiple ports via an optical splitter.

The photodiodes are highly responsive at the control wavelength. The photodiodes may be unresponsive at the traffic wavelengths. Photodiodes that are highly responsive at the control wavelength but unresponsive at the traffic wavelength may be achieved by the choice of photodiode technology, the use of a filtering material as a coating for the photodiodes, or both. For example, the control beam may be 980 nm and/or 850 nm may be used with silicon photodiodes. The responsivity of silicon photodiodes is high for wavelengths below about 1100 nm and extremely small for wavelengths longer than about 1100 nm. If filtering is used, a multilayer dielectric thin film bandpass or low-pass filter coating may be used.

MEMS self resonances determine at which frequencies the mirrors oscillate if moved rapidly and the natural frequency of vibration in response to external vibration stimuli. Control of the mirror at precession frequencies significantly above the self-resonance frequency is problematic due to the need for increased drive levels and the minor phase lag. The mirror phase lag impacts the precession of precession vector angle calculations. If dithering is used to artificially enlarge the spot size and no vector measurements are made, the mirror movement phase relative to the drive phase is not important, and the dithering may use much higher frequencies than precession. For example, frequencies much higher that 1 kHz may be problematic for precession, but not for dithering.

Aligning MEMS minor pairs using fine precession and/or coarse precession takes several tens of milliseconds for alignment. The time is affected by many factors, such as mirror mass, gimbal torsion spring strength, the resonant frequency, the damping factor of the resonance, the size of the zone of uncertainty, the maximum usable precession frequency, and the pass-band bandwidth of the filtering for that frequency. Table 1, below, illustrates an example of the time for aligning mirrors using fine precession and coarse precession for an array of MEMS minors with a specific set of mirror mechanical properties, including minor mass-torsion spring resonant frequencies.

TABLE 1

| Action | Time |
| --- | --- |
| Interpret set up request, determine mirror pairing, access look-up table, and determine initial voltage values | <50 μs |
| Ramp voltage to mirrors to avoid overshoot | 1.5 ms |
| Determine if initial optical path is connected | <50 μs |
| Apply coarse precession at 1 kHz and 800 Hz | 37.5 ms |
| Measure phase and amplitude of precession envelope, compute and apply correction | 16.5 ms |
| Determine whether optical path is corrected after coarse precession | <50 μs |
| Apply fine precession at 1 kHz to one mirror | 15 ms |
| Apply correction to mirror and ramp signal | 1.5 ms |
| Apply fine precession at 800 kHz to one mirror | 15 ms |
| Apply correction to mirror and ramp signal | 1.5 ms |
| Set up time without coarse precession | 34.6 ms |
| Set up time with coarse precession | 88.65 ms |

Table 2 below illustrates an example of the time for aligning minors using minor photodiodes using an array of MEMS mirrors with the same specific set of mirror mechanical properties used in Table 1. The set up time without dithering is 5.1 ms, and the set up time with dithering is 8 ms. The mirrors can be dithered much faster than they can be precessed or orbited, because as the speed of rotational offset increases, the angular uncertainty of the fidelity of the minor movement increases. In effect, the mirror angle lags behind the drive voltage by an increasingly unknown amount as the frequency increases, which is of importance in precession measurements but not in dithering. In dithering, no angular or timing measurements are made, so the signal can be applied at higher speeds where the angular lag of the mirrors is uncertain. Aligning the mirrors using photodiodes may be about eight times faster than aligning using coarse and fine precession measured via the output collimators. The maximum time that in-service mirrors within the zone of uncertainty are locked is 6.1 ms.

TABLE 2

| Action | Time |
|---|---|
| Interpret set up request, determine mirror pairing, access look-up table, and determine initial voltage values | <200 μs |
| Ramp voltage to mirrors to avoid overshoot | 1.5 ms |
| Determine whether initial optical path is connected | <50 μs |
| Apply dithering at 2 kHz | 3 ms |
| Determine and apply correction vector | <50 μs |
| Ramp voltage to mirrors to avoid overshoot | 1.5 ms |
| Determine if initial optical path is present | <50 μs |
| Measure average power on photodiodes on both target mirrors | 100 μs |
| Compute corrective angle and phase | <50 μs |
| Apply correction to mirrors and ramp signal | 1.5 ms |
| Set up time without acquisition dithering | 5.1 ms |
| Set up time with acquisition dithering | 8 ms |

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A micro-electro-mechanical-system (MEMS) photonic switch comprising:
    a first plurality of collimators;
    a first mirror array optically coupled to the first plurality of collimators, wherein the first mirror array comprises a first plurality of mirrors, and wherein a first mirror of the first plurality of mirrors comprises a first plurality of photodiodes integrated on the first mirror; and
    a second mirror array optically coupled to the first mirror array, wherein the second mirror array comprises a second plurality of mirrors, and wherein the first plurality of photodiodes is configured to produce a first plurality of signals to control an angle of a second mirror of the second plurality of mirrors.

2. The MEMS photonic switch of claim 1, further comprising:
    a second plurality of collimators optically coupled to the second mirror array, wherein a second mirror on the second plurality of mirrors comprises a second plurality of photodiodes integrated on the second mirror.

3. The MEMS photonic switch of claim 2, wherein a first collimator of the first plurality of collimators is configured to receive a first optical beam, wherein the second mirror is configured to reflect the first optical beam, wherein a second collimator of the second plurality of collimators is configured to receive a second optical beam, and wherein the first mirror is configured to reflect the second optical beam.

4. The MEMS photonic switch of claim 3, wherein the first plurality of collimators are configured to be coupled to a first plurality of optical fibers, and wherein the second plurality of collimators are configured to be coupled to a second plurality of optical fibers, wherein optical fibers of the first plurality of optical fibers are single mode fibers at a control wavelength and a traffic wavelength.

5. The MEMS photonic switch of claim 3, wherein a first portion of the first plurality of mirrors within a zone of uncertainty of the second mirror comprises a third plurality of photodiodes, and wherein the first portion of the first plurality of mirrors is configured to be locked.

6. The MEMS photonic switch of claim 1, wherein the first plurality of photodiodes is configured to detect a control wavelength of a control optical signal without detecting a traffic wavelength of a traffic optical signal.

7. The MEMS photonic switch of claim 6, wherein the MEMS photonic switch is configured to coaxially project the control optical signal and the traffic optical signal.

8. The MEMS photonic switch of claim 6, wherein the first plurality of collimators is configured to coaxially project the control optical signal and the traffic optical signal.

9. The MEMS photonic switch of claim 1, wherein the first plurality of mirrors is integrated on a first substrate, wherein a third plurality of photodiodes is integrated on the first substrate and wherein the third plurality of photodiodes is disposed in interstitial spaces between the MEMS mirrors.

10. The MEMS photonic switch of claim 1, further comprising:
    a second collimator of a second plurality of collimators, wherein the second collimator is configured to receive a first optical control signal,
    wherein the second mirror is configured to receive the first optical control signal to produce a first optical control beam, and wherein a first photodiode of the first plurality of photodiodes having a first location is configured to detect a first beam spot of the first optical control beam to produce a first detected signal.

11. The MEMS photonic switch of claim 10, further comprising a control module configured to:
    determine a vector from the first location of the first photodiode to a center of a third mirror of the first mirror array in accordance with the first detected signal; and
    adjust a center of the first beam spot in accordance with the vector.

12. The MEMS photonic switch of claim 10, further comprising:
    a second photodiode of the first plurality of photodiodes having a second location, wherein the second photodiode is configured to detect the first beam spot to produce a second detected signal;
    a third photodiode of the first plurality of photodiodes having a third location, wherein the third photodiode is configured to detect the first beam spot to produce a third detected signal; and
    a control module configured to
        determine a center of the first beam spot in accordance with the first location, the first detected signal, the second location, the second detected signal, the third location, and the third detected signal, determine a vector from the center of the first beam spot to a center of the first mirror, and adjust an angle of the second mirror comprising adjusting the center of the first beam spot by the vector.

13. The MEMS photonic switch of claim 10, wherein the first collimator is configured to receive a second optical control signal, wherein the first mirror is configured to reflect the second optical control signal to produce a second optical control beam, the MEMS photonic switch further comprising:

a second photodiode on the second mirror, wherein the second photodiode is configured to detect a second beam spot of the second optical control beam to produce a second detected signal; and a control module configured to
adjust an angle of the first mirror in accordance with the second detected signal, and
adjust an angle of the second mirror in accordance with the first detected signal.

14. The MEMS photonic switch of claim 10, further comprising a second photodiode having a second location on a substrate of the first mirror array, wherein the second photodiode is configured to detect the first beam spot of the first optical control beam to produce a second detected optical signal.

15. The MEMS photonic switch of claim 1, further comprising a control system comprising:

a mirror acquisition control unit coupled to the first mirror array, wherein the mirror acquisition control unit is configured to receive a first plurality of signals from the first plurality of photodiodes having a first plurality of locations; and a mirror driver coupled to the mirror acquisition control unit, wherein the mirror driver is configured to control the second mirror in accordance with the first plurality of signals and the first plurality of locations.

16. The MEMS photonic switch of claim 15, further comprising a second plurality of collimators optically coupled to the second mirror array, wherein the control system further comprises a first inject optical signal module configured to inject a first control optical signal into a first collimator of the second plurality of collimators to reflect off the second mirror to form a first beam spot on the first mirror array.

17. The MEMS photonic switch of claim 15, wherein the mirror driver is further configured to dither the second mirror.

18. The MEMS photonic switch of claim 15, wherein the mirror driver is further configured to orbit the second mirror.

19. The MEMS photonic switch of claim 15, wherein the mirror acquisition control unit is further configured to receive a second plurality of signals from a second plurality of photodiodes between mirrors of the first mirror array.

20. The MEMS photonic switch of claim 15, wherein the mirror acquisition control unit is further configured to receive a second plurality of signals from a second plurality of photodiodes having a second plurality of locations on a second mirror of the first mirror array, wherein the mirror driver is further configured to control the second mirror in accordance with the second plurality of signals and the second plurality of locations.

21. The MEMS photonic switch of claim 15, wherein the mirror driver is further configured to initially position the second mirror in accordance with a geometry of a second plurality of locations of the first plurality of mirrors and a third plurality of locations of the second plurality of mirrors.

22. The MEMS photonic switch of claim 1, wherein the first plurality of photodiodes comprises a first photodiode having a first location, wherein the first photodiode is configured to detect a first beam spot to produce a first detected signal, the MEMS photonic switch further comprising a control module configured to:

determine a vector from the first location of the first photodiode to a center of a third mirror of the first mirror array in accordance with the first detected signal; and adjust a center of the first beam spot in accordance with the vector.

* * * * *

UNITED STATES PATENT AND TRADEMARK OFFICE
CERTIFICATE OF CORRECTION

PATENT NO. : 9,213,142 B2  
APPLICATION NO. : 14/086776  
DATED : December 15, 2015  
INVENTOR(S) : Alan Frank Graves It is certified that error appears in the above-identified patent and that said Letters Patent is hereby corrected as shown below:

In the Claims

In Col. 17, line 54, claim 1, delete "minor" and insert --mirror--.
In Col. 17, line 55, claim 1, delete "first plurality of minors," and insert --first plurality of mirrors,--.
In Col. 17, line 56, claim 1, delete "first plurality of minors" and insert --first plurality of mirrors--.
In Col. 17, line 58, claim 1, delete "first minor" and insert --first mirror--.
In Col. 17, line 59, claim 1, delete "second minor" and insert --second mirror--.
In Col. 17, line 62, claim 1, delete "second minor" and insert --second mirror--.
In Col. 17, line 63, claim 1, delete "second plurality of minors." and insert --second plurality of mirrors.--.
In Col. 17, line 67, claim 2, delete "second minor array, wherein a second minor on the" and insert --second mirror array, wherein a second mirror on the--.
In Col. 18, line 2, claim 2, delete "on the second minor" and insert --on the second mirror--.
In Col. 18, line 5, claim 3, delete "second minor" and insert --second mirror--.
In Col. 18, line 21, claim 5, delete "of minors" and insert --of mirrors--.
In Col. 18, line 52, claim 11, delete "third minor" and insert --third mirror--.
In Col. 19, line 4, claim 12, delete "first minor," and insert --first mirror,--.
In Col. 19, line 24, claim 14, delete "first minor" and insert --first mirror--.
In Col. 19, line 30, claim 15, delete "first minor" and insert --first mirror--.
In Col. 19, line 31, claim 15, delete "wherein the minor" and insert --wherein the mirror--.
In Col. 19, line 37, claim 15, delete "minor driver" and insert --mirror driver--.
In Col. 20, line 6, claim 16, delete "second minor" and insert --second mirror--.
In Col. 20, line 14, claim 19, delete "minors of the first minor array" and insert --mirrors of the first mirror array--.
In Col. 20, line 19, claim 20, delete "minor array, wherein the minor driver is" and insert --mirror array, wherein the mirror driver is--.
In Col. 20, line 20, claim 20, delete "second minor" and insert --second mirror--.
In Col. 20, line 27, claim 21, delete "plurality of minors." and insert --plurality of mirrors.--.
In Col. 20, line 35, claim 22, delete "third minor" and insert --third mirror--.

Signed and Sealed this  
Twenty-ninth Day of March, 2016

Michelle K. Lee  
*Director of the United States Patent and Trademark Office*